US 12,540,692 B2

(12) United States Patent
Gunji et al.

(10) Patent No.: US 12,540,692 B2
(45) Date of Patent: Feb. 3, 2026

(54) METHOD AND DEVICE FOR MEASUREMENT METHOD OF AXIAL FORCE OF A TUBE FITTING

(71) Applicant: Sanoh Industrial Co., Ltd., Shibuya-ku (JP)

(72) Inventors: Takahiro Gunji, Koga (JP); Atsushi Kurosawa, Koga (JP)

(73) Assignee: Sanoh Industrial Co., Ltd., Shibuya-ku (JP)

(*) Notice: Subject to any disclaimer, the term of this patent is extended or adjusted under 35 U.S.C. 154(b) by 335 days.

(21) Appl. No.: 18/517,598

(22) Filed: Nov. 22, 2023

(65) Prior Publication Data

US 2024/0093812 A1    Mar. 21, 2024

Related U.S. Application Data

(62) Division of application No. 16/794,969, filed on Feb. 19, 2020, now Pat. No. 11,879,572.

(30) Foreign Application Priority Data

Feb. 22, 2019    (JP) .................................. 2019-045239

(51) Int. Cl.
*F16L 19/025* (2006.01)
*B32B 1/08* (2006.01)
(Continued)

(52) U.S. Cl.
CPC .............. *F16L 19/025* (2013.01); *B32B 1/08* (2013.01); *B60T 17/043* (2013.01);
(Continued)

(58) Field of Classification Search
CPC . F16L 19/0243; F16L 19/025; F16L 19/0283; F16L 19/0286; B32B 1/08; B60T 17/043
(Continued)

(56) References Cited

U.S. PATENT DOCUMENTS 5,615,575 A * 4/1997 Goodwin ................ B23P 19/06
                                                  702/179
5,792,961 A * 8/1998 Giebner ................ G01L 5/0033
                                                   73/826

(Continued)

FOREIGN PATENT DOCUMENTS

DE    102015007867 A1    12/2016
EP        2706277 A       3/2014
(Continued)

OTHER PUBLICATIONS

European Search Report for EP application No. 20 15 8202 dated May 26, 2020.

(Continued)

*Primary Examiner* — John Fitzgerald
(74) *Attorney, Agent, or Firm* — McDonald Hopkins LLC

(57) ABSTRACT

An axial force measurement device includes a frame, a tightening actuation unit that performs tightening operation upon a screw type tube fitting installed upon a tube upon which is formed an annular portion projecting in the radially outward direction from the tube, a testing member, and a mating member holding unit that holds the testing member into which the tube fitting is screwed and that is coupled to the tube. The tightening actuation unit and the mating member holding unit are provided to the frame in line along the direction of a reference axis that extends in the direction of the center line of the tube fitting and the tube axis of the tube. The testing member has a first part that engages with the tube fitting, and a second part against which the annular portion of the tube is pressed.

3 Claims, 18 Drawing Sheets

(51) Int. Cl.
  *B60T 17/04* (2006.01)
  *F16L 19/02* (2006.01)
  *F16L 19/028* (2006.01)
  *F16L 58/04* (2006.01)
  *F16L 58/18* (2006.01)

(52) U.S. Cl.
  CPC ....... *F16L 19/0243* (2013.01); *F16L 19/0283* (2013.01); *F16L 58/04* (2013.01); *F16L 58/184* (2013.01); *B32B 2597/00* (2013.01)

(58) Field of Classification Search
  USPC ............................... 73/761, 826, 856, 865.9
  See application file for complete search history.

(56) References Cited

U.S. PATENT DOCUMENTS

| | | | |
|---|---|---|---|
| 5,945,607 A * | 8/1999 | Peppel | G01N 3/04 73/857 |
| 6,446,510 B1 | 9/2002 | Kurtz et al. | |
| 7,360,798 B2 | 4/2008 | Matsumoto et al. | |
| 8,096,194 B2 * | 1/2012 | Chiapuzzi | G01L 5/24 73/761 |
| 8,857,857 B2 | 10/2014 | Goto et al. | |
| 9,321,982 B2 | 4/2016 | Goto et al. | |
| 10,072,778 B2 | 9/2018 | Heutchy | |
| 10,107,429 B2 | 10/2018 | Jensen | |
| 10,125,905 B2 | 11/2018 | Stahn | |
| 10,132,431 B2 * | 11/2018 | Fujii | F16L 19/028 |
| 11,879,572 B2 * | 1/2024 | Gunji | F16L 19/0243 |
| 12,297,935 B2 * | 5/2025 | Gunji | F16L 19/0283 |
| 2006/0228505 A1 | 10/2006 | Goto et al. | |
| 2007/0196632 A1 | 8/2007 | Meyer et al. | |
| 2009/0324363 A1 | 12/2009 | Abbott et al. | |
| 2011/0174085 A1 | 7/2011 | Won et al. | |
| 2011/0204623 A1 | 8/2011 | Weick et al. | |
| 2013/0333480 A1 * | 12/2013 | Kessler | G01N 3/04 73/788 |
| 2015/0354735 A1 | 12/2015 | Stahn | |
| 2018/0172197 A1 | 6/2018 | Verleene et al. | |
| 2021/0364119 A1 | 11/2021 | Goto | |

FOREIGN PATENT DOCUMENTS

| | | |
|---|---|---|
| JP | 2009-299895 A | 12/2009 |
| JP | 2015-230099 A | 12/2015 |
| WO | 2005098300 A1 | 10/2005 |
| WO | 2019012444 A1 | 1/2019 |
| WO | WO-2019069428 A1 * | 4/2019 ............... G01N 1/22 |

OTHER PUBLICATIONS

Office Action for EP 20 158 202.0 dated Jun. 10, 2020.
European Search Report for application EP 21 17 5341 dated Jul. 21, 2021.
European Search report for application No. EP 21 17 5368 Jun. 29, 2021.
Opposition against EP 3699 472 B1 dated Apr. 21, 2022 and the translation thereof.
DIN 74 233, "Hydraulica braking systems; Fittinf for brake pipes; Male fittings for brake pipes" Feb. 1991 [Described in English Translation of Opposition Document].
DIN 74 234 "Hydraulic braking systems; brake pipes, flares" Jul. 1991 [Described in English Translation of Opposition Document].
"Plastics—Resins in the liquid state or as emulsions or dispersions—Determination of apparent viscosity by the Brookfield Test Method" The European Standard EN ISO 2555-1999, pp. include front cover, an inside front cover, pp. i and ii, the EN ISO title page, the EN ISO foreword, pp. 1 to 7 and a back cover.

* cited by examiner

FIG.11A

| Sample Number | Group | Coating Material | Nominal Diameter of Thread [mm] | Inner Diameter of Contact Portion d [mm] | Outer Diameter of Tube φ[mm] | Temperature at Immersion t [°C] | Rotational Speed at Drying [rpm] | Mass per Unit Area [g/m²] |
|---|---|---|---|---|---|---|---|---|
| #101 | G1 | C1 | M10 | 4.98 | 4.76 | 30 | 500 | 3.18 |
| #102 | | | | | | 30 | 800 | 0.86 |
| #103 | | | | | | 35 | 200 | 9.15 |
| #104 | | | | | | 35 | 500 | 4.00 |
| #105 | | | | | | 40 | 200 | 11.02 |
| #106 | | | | | | 40 | 500 | 7.77 |
| #107 | | | | | | 40 | 600 | 5.37 |
| #108 | G2 | C1 | M12 | 4.98 | 4.76 | 30 | 200 | 6.39 |
| #109 | | | | | | 30 | 600 | 1.58 |
| #110 | | | | | | 30 | 800 | 0.46 |
| #111 | | | | | | 35 | 500 | 6.55 |
| #112 | | | | | | 35 | 600 | 5.49 |
| #113 | | | | | | 40 | 200 | 10.21 |
| #114 | | | | | | 40 | 500 | 8.92 |
| #115 | G3 | C1 | M12 | 6.24 | 6 | 30 | 800 | 1.12 |
| #116 | | | | | | 35 | 500 | 7.29 |
| #117 | | | | | | 35 | 600 | 6.06 |
| #118 | | | | | | 35 | 800 | 3.55 |
| #119 | | | | | | 40 | 200 | 10.33 |
| #120 | | | | | | 40 | 400 | 9.85 |
| #121 | | | | | | 40 | 600 | 6.48 |
| #201 | G4 | C2 | M10 | 4.98 | 4.76 | 30 | 500 | 2.82 |
| #202 | | | | | | 30 | 800 | 0.61 |
| #203 | | | | | | 35 | 200 | 10.15 |
| #204 | | | | | | 35 | 500 | 6.50 |
| #205 | | | | | | 35 | 800 | 2.49 |
| #206 | | | | | | 40 | 500 | 9.30 |
| #207 | | | | | | 40 | 600 | 7.46 |
| #208 | G5 | C2 | M12 | 4.98 | 4.76 | 30 | 500 | 3.31 |
| #209 | | | | | | 30 | 800 | 0.48 |
| #210 | | | | | | 35 | 200 | 11.69 |
| #211 | | | | | | 35 | 500 | 6.58 |
| #212 | | | | | | 35 | 600 | 4.90 |
| #213 | | | | | | 40 | 200 | 10.06 |
| #214 | | | | | | 40 | 600 | 7.09 |
| #215 | G6 | C2 | M12 | 6.24 | 6 | 30 | 500 | 3.94 |
| #216 | | | | | | 30 | 600 | 1.21 |
| #217 | | | | | | 35 | 500 | 6.33 |
| #218 | | | | | | 35 | 800 | 0.55 |
| #219 | | | | | | 40 | 200 | 10.02 |
| #220 | | | | | | 40 | 500 | 6.40 |
| #221 | | | | | | 40 | 800 | 5.27 |

FIG.11B

| Sample Number | Group | Coating Material | Nominal Diameter of Thread [mm] | Inner Diameter of Contact Portion d [mm] | Outer Diameter of Tube φ[mm] | Temperature at Immersion t [°C] | Rotational Speed at Drying [rpm] | Mass per Unit Area [g/m²] |
|---|---|---|---|---|---|---|---|---|
| #301 | G7 | C3 | M10 | 4.98 | 4.76 | 30 | 400 | 4.12 |
| #302 | | | | | | 30 | 500 | 3.39 |
| #303 | | | | | | 30 | 600 | 2.31 |
| #304 | | | | | | 35 | 500 | 5.76 |
| #305 | | | | | | 35 | 600 | 4.41 |
| #306 | | | | | | 40 | 500 | 9.68 |
| #307 | | | | | | 40 | 600 | 8.31 |
| #308 | G8 | C3 | M12 | 4.98 | 4.76 | 30 | 200 | 6.56 |
| #309 | | | | | | 30 | 500 | 3.32 |
| #310 | | | | | | 30 | 600 | 2.85 |
| #311 | | | | | | 35 | 600 | 5.74 |
| #312 | | | | | | 40 | 200 | 10.10 |
| #313 | | | | | | 40 | 500 | 8.15 |
| #314 | | | | | | 40 | 600 | 7.16 |
| #315 | G9 | C3 | M12 | 6.24 | 6 | 30 | 500 | 4.99 |
| #316 | | | | | | 30 | 600 | 2.83 |
| #317 | | | | | | 35 | 200 | 8.01 |
| #318 | | | | | | 35 | 500 | 5.34 |
| #319 | | | | | | 35 | 600 | 4.21 |
| #320 | | | | | | 40 | 200 | 11.59 |
| #321 | | | | | | 40 | 500 | 7.72 |
| #401 | G10 | C4 | M10 | 4.98 | 4.76 | 30 | 400 | 2.51 |
| #402 | | | | | | 35 | 200 | 11.12 |
| #403 | | | | | | 35 | 500 | 5.20 |
| #404 | | | | | | 35 | 600 | 4.52 |
| #405 | | | | | | 40 | 200 | 11.84 |
| #406 | | | | | | 40 | 400 | 9.28 |
| #407 | | | | | | 40 | 500 | 7.30 |
| #408 | G11 | C4 | M12 | 4.98 | 4.76 | 30 | 500 | 3.37 |
| #409 | | | | | | 30 | 600 | 2.50 |
| #410 | | | | | | 30 | 800 | 0.84 |
| #411 | | | | | | 35 | 200 | 7.81 |
| #412 | | | | | | 35 | 500 | 6.33 |
| #413 | | | | | | 35 | 600 | 5.84 |
| #414 | | | | | | 40 | 500 | 9.37 |
| #415 | G12 | C4 | M12 | 6.24 | 6 | 30 | 500 | 2.55 |
| #416 | | | | | | 30 | 800 | 0.80 |
| #417 | | | | | | 35 | 200 | 8.76 |
| #418 | | | | | | 35 | 500 | 5.51 |
| #419 | | | | | | 35 | 600 | 4.26 |
| #420 | | | | | | 40 | 200 | 10.21 |
| #421 | | | | | | 40 | 600 | 5.69 |

FIG.13A

| Sample Number | Group | Coating Material | Nominal Diameter of Thread [mm] | Mass per Unit Area [g/m²] | Axial Force Decrease Ratio α [kN/turn] | Initial Axial Force F1 [kN] |
|---|---|---|---|---|---|---|
| #101 | G1 | C1 | M10 | 3.18 | 0.9600 | 13.2218 |
| #102 | | | | 0.86 | 1.1935 | 11.4758 |
| #103 | | | | 9.15 | 1.1155 | 12.8214 |
| #104 | | | | 4.00 | 0.9833 | 13.1220 |
| #105 | | | | 11.02 | 1.0213 | 14.7436 |
| #106 | | | | 7.77 | 0.9493 | 13.0133 |
| #107 | | | | 5.37 | 0.9377 | 13.6458 |
| #108 | G2 | C1 | M12 | 6.39 | 0.9539 | 12.4178 |
| #109 | | | | 1.58 | 1.5329 | 11.7491 |
| #110 | | | | 0.46 | 1.9147 | 12.0185 |
| #111 | | | | 6.55 | 0.6921 | 13.5865 |
| #112 | | | | 5.49 | 1.1600 | 11.8483 |
| #113 | | | | 10.21 | 0.8921 | 14.3359 |
| #114 | | | | 8.92 | 0.6222 | 13.8125 |
| #115 | G3 | C1 | M12 | 1.12 | 1.1144 | 11.8288 |
| #116 | | | | 7.29 | 0.8507 | 11.7053 |
| #117 | | | | 6.06 | 0.9096 | 12.8388 |
| #118 | | | | 3.55 | 0.8576 | 11.6543 |
| #119 | | | | 10.33 | 0.4858 | 14.5999 |
| #120 | | | | 9.85 | 0.7145 | 13.3927 |
| #121 | | | | 6.48 | 0.8682 | 13.5250 |
| #201 | G4 | C2 | M10 | 2.82 | 1.0433 | 12.9644 |
| #202 | | | | 0.61 | 1.8107 | 10.5240 |
| #203 | | | | 10.15 | 0.8408 | 14.2918 |
| #204 | | | | 6.50 | 0.8184 | 13.6686 |
| #205 | | | | 2.49 | 0.9603 | 12.5171 |
| #206 | | | | 9.30 | 0.7758 | 13.7429 |
| #207 | | | | 7.46 | 1.0433 | 12.4590 |
| #208 | G5 | C2 | M12 | 3.31 | 1.2592 | 11.3944 |
| #209 | | | | 0.48 | 1.8491 | 11.2150 |
| #210 | | | | 11.69 | 0.7861 | 14.2725 |
| #211 | | | | 6.59 | 0.9411 | 13.2151 |
| #212 | | | | 4.90 | 1.2112 | 13.5503 |
| #213 | | | | 10.06 | 1.1034 | 13.7750 |
| #214 | | | | 7.09 | 0.7233 | 12.7679 |
| #215 | G6 | C2 | M12 | 3.94 | 1.1327 | 13.7195 |
| #216 | | | | 1.21 | 1.6255 | 12.1937 |
| #217 | | | | 6.33 | 1.1510 | 13.7289 |
| #218 | | | | 0.55 | 1.8433 | 10.9115 |
| #219 | | | | 10.02 | 0.9009 | 12.8113 |
| #220 | | | | 6.40 | 1.5897 | 12.8337 |
| #221 | | | | 5.27 | 0.7526 | 13.8114 |

FIG.13B

| Sample Number | Group | Coating Material | Nominal Diameter of Thread [mm] | Mass per Unit Area [g/m²] | Axial Force Decrease Ratio α [kN/turn] | Initial Axial Force F1 [kN] |
|---|---|---|---|---|---|---|
| #301 | G7 | C3 | M10 | 4.12 | 0.8901 | 12.9094 |
| #302 | | | | 3.39 | 1.2062 | 12.1113 |
| #303 | | | | 2.31 | 1.2660 | 13.8431 |
| #304 | | | | 5.76 | 1.2194 | 13.4691 |
| #305 | | | | 4.41 | 1.1168 | 13.0234 |
| #306 | | | | 9.68 | 0.9984 | 13.0181 |
| #307 | | | | 8.31 | 1.1542 | 13.0771 |
| #308 | G8 | C3 | M12 | 6.56 | 0.8139 | 13.1774 |
| #309 | | | | 3.32 | 0.9531 | 13.5715 |
| #310 | | | | 2.85 | 1.2276 | 11.9494 |
| #311 | | | | 5.74 | 1.1155 | 13.3487 |
| #312 | | | | 10.10 | 1.2115 | 14.1118 |
| #313 | | | | 8.15 | 0.6970 | 12.5274 |
| #314 | | | | 7.16 | 0.7256 | 13.7498 |
| #315 | G9 | C3 | M12 | 4.99 | 1.0589 | 11.3469 |
| #316 | | | | 2.83 | 1.0358 | 13.0755 |
| #317 | | | | 8.01 | 0.9460 | 13.0199 |
| #318 | | | | 5.34 | 0.8933 | 12.5636 |
| #319 | | | | 4.21 | 0.7682 | 13.0865 |
| #320 | | | | 11.59 | 0.5130 | 14.1136 |
| #321 | | | | 7.72 | 0.8723 | 12.7162 |
| #401 | G10 | C4 | M10 | 2.51 | 1.2961 | 12.6211 |
| #402 | | | | 11.12 | 0.8447 | 14.3626 |
| #403 | | | | 5.20 | 1.2879 | 12.6550 |
| #404 | | | | 4.52 | 0.9048 | 12.9978 |
| #405 | | | | 11.84 | 1.0360 | 14.1841 |
| #406 | | | | 9.28 | 0.8982 | 12.5870 |
| #407 | | | | 7.30 | 1.2091 | 12.5698 |
| #408 | G11 | C4 | M12 | 3.37 | 0.9278 | 13.0021 |
| #409 | | | | 2.50 | 0.9886 | 12.5171 |
| #410 | | | | 0.84 | 1.1538 | 10.7621 |
| #411 | | | | 7.81 | 1.2387 | 12.8625 |
| #412 | | | | 6.33 | 0.6209 | 13.1992 |
| #413 | | | | 5.84 | 1.1463 | 13.2227 |
| #414 | | | | 9.37 | 0.8923 | 13.1968 |
| #415 | G12 | C4 | M12 | 2.55 | 1.0090 | 11.5174 |
| #416 | | | | 0.80 | 1.2155 | 11.3767 |
| #417 | | | | 8.76 | 0.9409 | 13.6745 |
| #418 | | | | 5.51 | 0.9344 | 13.1440 |
| #419 | | | | 4.26 | 0.9447 | 12.3808 |
| #420 | | | | 10.21 | 0.8190 | 14.8126 |
| #421 | | | | 5.69 | 0.8742 | 12.4799 |

FIG.14A

| Sample Number | Rotational Speed at Drying [rpm] | Mass per Unit Area [g/m²] | Yes/No | Reference Standard "a" | Reference Standard "b" | Initial Axial Force F1 [kN] | Axial Force Decrease Ratio α [kN/turn] |
|---|---|---|---|---|---|---|---|
| #110 | 800 | 0.46 | NO | y | n | 12.0185 | 1.9147 |
| #209 | 800 | 0.48 | NO | y | n | 11.2150 | 1.8491 |
| #218 | 800 | 0.55 | NO | y | n | 10.9115 | 1.8433 |
| #202 | 800 | 0.61 | NO | y | n | 10.5240 | 1.8107 |
| #416 | 800 | 0.80 | YES | y | y | 11.3767 | 1.2155 |
| #410 | 800 | 0.84 | YES | y | y | 10.7621 | 1.1538 |
| #102 | 800 | 0.86 | YES | y | y | 11.4758 | 1.1935 |
| #115 | 800 | 1.12 | YES | y | y | 11.8288 | 1.1144 |
| #216 | 600 | 1.21 | YES | y | y | 12.1937 | 1.6255 |
| #109 | 600 | 1.58 | YES | y | y | 11.7491 | 1.5329 |
| #303 | 600 | 2.31 | YES | y | y | 13.8431 | 1.2660 |
| #205 | 800 | 2.49 | YES | y | y | 12.5171 | 0.9603 |
| #409 | 600 | 2.50 | YES | y | y | 12.5171 | 0.9886 |
| #401 | 400 | 2.51 | YES | y | y | 12.6211 | 1.2961 |
| #415 | 500 | 2.55 | YES | y | y | 11.5174 | 1.0090 |
| #201 | 500 | 2.82 | YES | y | y | 12.9644 | 1.0433 |
| #316 | 600 | 2.83 | YES | y | y | 13.0755 | 1.0358 |
| #310 | 600 | 2.85 | YES | y | y | 11.9494 | 1.2276 |
| #101 | 500 | 3.18 | YES | y | y | 13.2218 | 0.9600 |
| #208 | 500 | 3.31 | YES | y | y | 11.3944 | 1.2592 |
| #309 | 500 | 3.32 | YES | y | y | 13.5715 | 0.9531 |
| #408 | 500 | 3.37 | YES | y | y | 13.0021 | 0.9278 |
| #302 | 500 | 3.39 | YES | y | y | 12.1113 | 1.2062 |
| #118 | 800 | 3.55 | YES | y | y | 11.6543 | 0.8576 |
| #215 | 500 | 3.94 | YES | y | y | 13.7195 | 1.1327 |
| #104 | 500 | 4.00 | YES | y | y | 13.1220 | 0.9833 |
| #301 | 400 | 4.12 | YES | y | y | 12.9094 | 0.8901 |
| #319 | 600 | 4.21 | YES | y | y | 13.0865 | 0.7682 |
| #419 | 600 | 4.26 | YES | y | y | 12.3808 | 0.9447 |
| #305 | 600 | 4.41 | YES | y | y | 13.0234 | 1.1168 |
| #404 | 600 | 4.52 | YES | y | y | 12.9978 | 0.9048 |
| #212 | 600 | 4.90 | YES | y | y | 13.5503 | 1.2112 |
| #315 | 500 | 4.99 | YES | y | y | 11.3469 | 1.0589 |
| #403 | 500 | 5.20 | YES | y | y | 12.6550 | 1.2879 |
| #221 | 800 | 5.27 | YES | y | y | 13.8114 | 0.7526 |
| #318 | 500 | 5.34 | YES | y | y | 12.5636 | 0.8933 |
| #107 | 600 | 5.37 | YES | y | y | 13.6458 | 0.9377 |
| #112 | 600 | 5.49 | YES | y | y | 11.8483 | 1.1600 |
| #418 | 500 | 5.51 | YES | y | y | 13.1440 | 0.9344 |
| #421 | 600 | 5.69 | YES | y | y | 12.4799 | 0.8742 |
| #311 | 600 | 5.74 | YES | y | y | 13.3487 | 1.1155 |
| #304 | 500 | 5.76 | YES | y | y | 13.4691 | 1.2194 |
| #413 | 600 | 5.84 | YES | y | y | 13.2227 | 1.1463 |
| #117 | 600 | 6.06 | YES | y | y | 12.8388 | 0.9096 |
| #217 | 500 | 6.33 | YES | y | y | 13.7289 | 1.1510 |

FIG.14B

| Sample Number | Rotational Speed at Drying [rpm] | Mass per Unit Area [g/m$^2$] | Yes/No | Reference Standard "a" | Reference Standard "b" | Initial Axial Force F1 [kN] | Axial Force Decrease Ratio α [kN/turn] |
|---|---|---|---|---|---|---|---|
| #412 | 500 | 6.33 | YES | y | y | 13.1992 | 0.6209 |
| #108 | 200 | 6.39 | YES | y | y | 12.4178 | 0.9539 |
| #220 | 500 | 6.40 | YES | y | y | 12.8337 | 1.5897 |
| #121 | 600 | 6.48 | YES | y | y | 13.5250 | 0.8682 |
| #204 | 500 | 6.50 | YES | y | y | 13.6686 | 0.8184 |
| #111 | 500 | 6.55 | YES | y | y | 13.5865 | 0.6921 |
| #308 | 200 | 6.56 | YES | y | y | 13.1774 | 0.8139 |
| #211 | 500 | 6.59 | YES | y | y | 13.2151 | 0.9411 |
| #214 | 600 | 7.09 | YES | y | y | 12.7679 | 0.7233 |
| #314 | 600 | 7.16 | YES | y | y | 13.7498 | 0.7256 |
| #116 | 500 | 7.29 | YES | y | y | 11.7053 | 0.8507 |
| #407 | 500 | 7.30 | YES | y | y | 12.5698 | 1.2091 |
| #207 | 600 | 7.46 | YES | y | y | 12.4590 | 1.0433 |
| #321 | 500 | 7.72 | YES | y | y | 12.7162 | 0.8723 |
| #106 | 500 | 7.77 | YES | y | y | 13.0133 | 0.9493 |
| #411 | 200 | 7.81 | YES | y | y | 12.8625 | 1.2387 |
| #317 | 200 | 8.01 | YES | y | y | 13.0199 | 0.9460 |
| #313 | 500 | 8.15 | YES | y | y | 12.5274 | 0.6970 |
| #307 | 600 | 8.31 | YES | y | y | 13.0771 | 1.1542 |
| #417 | 200 | 8.76 | YES | y | y | 13.6745 | 0.9409 |
| #114 | 500 | 8.92 | YES | y | y | 13.8125 | 0.6222 |
| #103 | 200 | 9.15 | YES | y | y | 12.8214 | 1.1155 |
| #406 | 400 | 9.28 | YES | y | y | 12.5870 | 0.8982 |
| #206 | 500 | 9.30 | YES | y | y | 13.7429 | 0.7758 |
| #414 | 500 | 9.37 | YES | y | y | 13.1968 | 0.8923 |
| #306 | 500 | 9.68 | YES | y | y | 13.0181 | 0.9984 |
| #120 | 400 | 9.85 | YES | y | y | 13.3927 | 0.7145 |
| #219 | 200 | 10.02 | YES | y | y | 12.8113 | 0.9009 |
| #213 | 200 | 10.06 | YES | y | y | 13.7750 | 1.1034 |
| #312 | 200 | 10.10 | NO | n | y | 14.1118 | 1.2115 |
| #203 | 200 | 10.15 | NO | n | y | 14.2918 | 0.8408 |
| #113 | 200 | 10.21 | NO | n | y | 14.3359 | 0.8921 |
| #420 | 200 | 10.21 | NO | n | y | 14.8126 | 0.8190 |
| #119 | 200 | 10.33 | NO | n | y | 14.5999 | 0.4858 |
| #105 | 200 | 11.02 | NO | n | y | 14.7436 | 1.0213 |
| #402 | 200 | 11.12 | NO | n | y | 14.3626 | 0.8447 |
| #320 | 200 | 11.59 | NO | n | y | 14.1136 | 0.5130 |
| #210 | 200 | 11.69 | NO | n | y | 14.2725 | 0.7861 |
| #405 | 200 | 11.84 | NO | n | y | 14.1841 | 1.0360 |

METHOD AND DEVICE FOR MEASUREMENT METHOD OF AXIAL FORCE OF A TUBE FITTING

CROSS-REFERENCE TO RELATED APPLICATION

This is a division of prior U.S. application Ser. No. 16/794,969 filed Feb. 19, 2020, now U.S. Pat. No. 11,879,572, which claims priority of Japanese Patent Application No. 2019-45239, filed on Feb. 22, 2019 in the Japan Patent Office, both of which are incorporated herein by reference in their entirety.

TECHNICAL FIELD

The present invention relates to a tube fitting and to a tube equipped with a tube fitting.

BACKGROUND ART

It is per se known to apply a lubricant and/or an adhesive to the surface of a screw member such as a standardized bolt or nut, and to perform surface processing such as plating and so on thereupon, with the object of preventing loosening of the screw member and enhancing the axial force. Furthermore, a technique is per se known of applying a resin coating to a threaded tube fitting that is employed for an automobile brake tube or the like. For example, refer to Japanese Laid-Open Patent Publication 2015-230099, Japanese Laid-Open Patent Publication 2009-299895, and European Patent Application Publication 2,706,277.

If the tightening torque for fastening a screw member to a mating member is constant, then the axial force becomes greater, the lower is the frictional force acting between the screw member and the mating member. Accordingly, surface treatment is performed upon the screw member, in order to reduce the frictional force. This makes it possible to obtain a higher axial force with the same tightening torque. This does not only hold for standardized screw members; the same is the case for threaded tube fittings. For example, tube fittings are used for coupling metallic tubes.

SUMMARY OF INVENTION

Technical Problem

When a tube fitting is used for coupling of a metallic tube, with the tube fitting installed on the external periphery of the tube, an annular portion termed an ISO flare or a double flare or the like is formed upon the tube end of the tube. Since this annular portion projects radially outward from the tube and is larger than the inner diameter of the tube fitting, accordingly the tube fitting is prevented from coming off the tube end of the tube by the annular portion. Moreover, since a tube employed for piping on an automobile is bent to follow the layout of the bottom portion of the vehicle, accordingly the tube fitting is also prevented from coming off in the direction away from the tube end by the bent portion of the tube. Due to this when, in order to perform servicing or repair of some device to which the tube is coupled, the fastening state of the tube fitting is loosened and, after the tube has been removed, it is returned back to the original state, it is necessary to re-use the same tube fitting for each time of the serving or fitting, as long as the tube fitting is replaced together with the tube during such servicing or repair.

When, in order to re-use the tube fitting, the tube fitting is repeatedly fastened and released with the same tightening torque, there has been a tendency for the axial force to decrease along with increase of the number of repetitions. Since the axial force is less the greater is this axial force decrease ratio, accordingly, if the same tightening torque is employed for engagement when reusing a tube fitting, there is a possibility that it will not be possible to obtain the desired coupling force with the re-used tube fitting.

On the other hand, when the tube fitting is fastened, sometimes it may happen that co-rotation may take place, in which the tube rotates together with the tube fitting. The co-rotation occurs when the frictional force generated between the annular portion provided to the tube and the tube fitting exceeds the frictional force generated between the annular portion and the mating member. If the tube fitting is fastened while fixating the tube in order to prevent this co-rotation, then a co-rotation torque that twists the tube is generated as a reaction force to prevent the co-rotation. If this co-rotation torque is high, then damage to the tube may take place. Furthermore, since the reaction force of the co-rotation torque acts in the direction to loosen the tube fitting which has been fastened, accordingly, if the co-rotation torque remains in the state with the tube attached to the vehicle, then loosening of the tube fitting may be induced by vibration of the vehicle. Accordingly, the upper limit value of the co-rotation torque that is generated when fastening the tube fitting is determined in consideration of the strength of the tube and in consideration of vibration of the vehicle.

The co-rotation torque is at a maximum when the tube fitting is fastened for the first time, decreases the next time it is used, and tends not to change very much with the number of times it is subsequently used. Due to this, if the co-rotation torque is less than the upper limit value at the first fastening, then the co-rotation torque will not exceed this upper limit value when the tube fitting is re-used.

The present inventors have found that a factor affecting the axial force decrease ratio due to re-use of the tube fitting and the co-rotation torque at the time of initial fastening is the thickness of the resin coating layer. Furthermore, the present inventors have found that the thickness of the resin coating layer is one of the factors that exerts influence upon the corrosion resistance of the tube fitting, and that, if the thickness of the resin coating layer is different, then there will be a difference in the corrosion resistance of the tube fitting when it is re-used.

Accordingly, an aspect of the present invention is for solving a problem to provide a tube fitting and a tube equipped with a tube fitting that are capable of providing an initial axial force that makes the co-rotation torque less than an upper limit value and of keeping the axial force decrease ratio low when the tube fitting is repeatedly fastened and released. Further, an aspect of the present invention is for solving a problem to provide a tube fitting and a tube equipped with a tube fitting that are capable of ensuring corrosion resistance upon re-use that is equivalent to the corrosion resistance upon initial fastening. The above descriptions about the problems do not prevent from the presence of the other problems. It should be understood that it is not necessary that each of the aspects of the present invention solves all of the above problems.

Solution to Technical Problem

A tube fitting according to an aspect of the present invention is provided with a resin coating layer over a coated region including surfaces of a threaded portion and a contact portion. The resin coating layer includes a polyethylene based substance, a lubricant, and solid particles. When mass per unit area w (g/m²) is defined as being a value obtained by dividing the mass difference between a state with the resin coating layer and a state without the resin coating layer by the surface area of the coated region, the mass per unit area w satisfies a relation 0.79<w<10.07. This relation is satisfied under conditions that an external thread of the threaded portion has an outer diameter of 9.53 to 14.0 mm, and the contact portion has an inner diameter of 4.98 to 8.44 mm, with respect to the tube fitting.

A tube equipped with a tube fitting according to an aspect of the present invention includes a tube made from metal and the tube fitting installed upon an external periphery of the tube. The tube is provided with an annular portion and a bent portion to prevent the tube fitting from coming off. The tube fitting is provided with a resin coating layer over a coated region that includes surfaces of a threaded portion and a contact portion. The resin coating layer includes a polyethylene based substance, a lubricant, and solid particles. When mass per unit area w (g/m²) is defined as being a value obtained by dividing a mass difference between a state with the resin coating layer and a state without the resin coating layer by a surface area of the coated region, the mass per unit area w satisfies a relation 0.79<w<10.07. This relation is satisfied under conditions that an external thread of the threaded portion has an outer diameter of 9.53 to 14.0 mm, and the contact portion has an inner diameter of 4.98 to 8.44 mm.

A tube fitting according to an aspect of the present invention is provided with a resin coating layer over a coated region including surfaces of a threaded portion and a contact portion. The resin coating layer includes a polyethylene based substance, a lubricant, and solid particles. When a predetermined fastening test is repeated n times (where 1<n<6), if a maximum axial force generated in a first performance of the fastening test is termed an initial axial force $F_1$ (kN) and a maximum axial force generated in the n-th performance of the fastening test is termed the n-th axial force $F_n$ (kN), and if a value obtained by $-(F_n-F_1)/(n-1)$ is defined as being an axial force decrease ratio α (kN/turn), then a range of the mass per unit area w is set so as to satisfy relations: F1<14.0 and 0<α<1.75. This relation is satisfied under conditions that an external thread of the threaded portion has an outer diameter of 9.53 to 14.0 mm, and the contact portion has an inner diameter of 4.98 to 8.44 mm.

It should be understood that, in each aspect of the present invention, the surface of the threaded portion means the surface in the range where the screw thread is formed that is actually engaged with the internal thread of the mating member, or that is scheduled to engage with that internal thread. Moreover, the surface of the contact portion means the contact surface that actually contacts the annular portion or the contact surface that is scheduled to contact the annular portion. And "including the surfaces of the threaded portion and the contact portion" means including all or a part of the surface of the threaded portion, and including all or a portion of the surface of the contact portion. In addition, the resin coating layer may be made by adhering coating material including the polyethylene based substance, the lubricant, and the solid particles to the coated region,

BRIEF DESCRIPTION OF DRAWINGS

FIG. 11A is a figure showing a list table of test samples;

FIG. 11B is a figure showing a list table following on from FIG. 11A;

FIG. 13A is a figure showing test results of a fastening test;

FIG. 13B is a figure continuing on from FIG. 13A;

FIG. 14A is a figure in which results of evaluation are summarized and are classified into passed samples and rejected samples;

FIG. 14B is a figure continuing on from FIG. 14A; and

DESCRIPTION OF EMBODIMENTS

As one example, the brake tubes of an automobile are employed as conduits that transmit fluid pressure generated by a master cylinder to brake units that are provided to each of the vehicle wheels. In many cases, an ABS unit and/or an ESC unit are provided between the master cylinder and the brake units, and brake tubes are also employed to connect between these units. A plurality of brake tubes having different diameters may be selected according to various conditions such as pressure resistance and so on required between these units.

Figure 1:
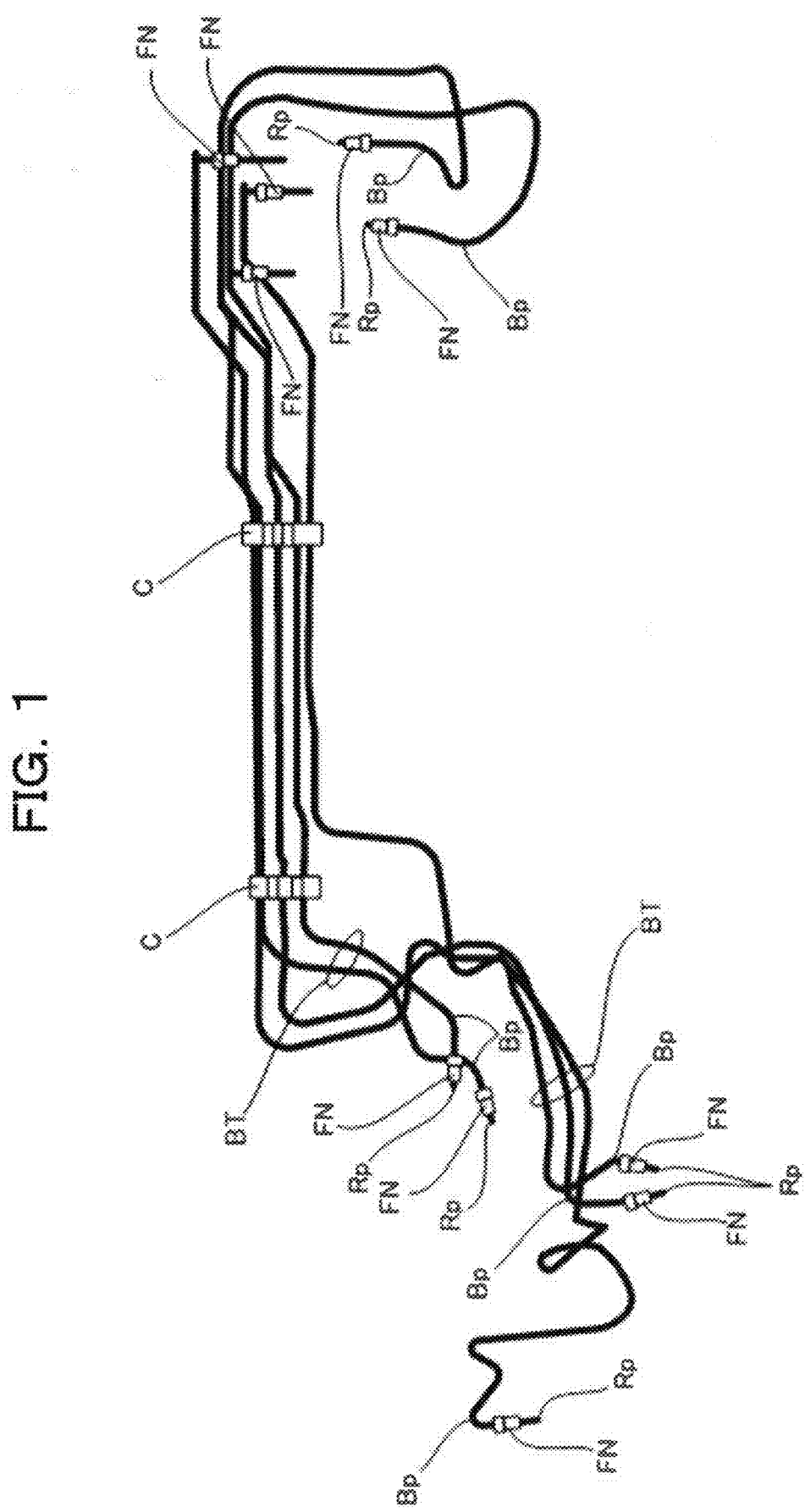
FIG. 1 is a figure showing a state when a plurality of brake tubes that have been processed by installation of tube fittings and by bending are assembled together.

As shown in FIG. 1, a group of brake tubes BT are processed by being bent according to the layout of the underside of an automobile, are gathered together and held by, for example, clamps C made from resin, and are supplied to an automobile assembly line as an integrated component for assembly. In order to stand up to the operating pressure of the brakes, each of the brake tubes BT is made as a double-walled wrapped tube made from metal plate such as steel sheet or the like, which has excellent pressure capacity. In the case of a brake tube, as one example, a tube with outer diameter φ from 4.76 to 8.00 mm may be selected. A flare nut FN is installed on each of the brake tubes BT, the flare unit FN being suited for an outer diameter of the brake tube BT. On the automobile assembly line, the operator implements coupling of the brake tubes BT collectively by fastening the flare nuts FN installed upon the brake tubes BT to each of the units mentioned above with a common tightening torque that is predetermined.

Tube end processing for high pressure is performed upon the tube end of each of the brake tubes BT in its state with its corresponding flare nuts FN installed upon it. As tube end processing for high pressure, there is tube end processing in which an ISO flare as prescribed by the International Organization for Standardization (ISO) is formed, or an annular portion Rp such as a double flare or the like as prescribed by the Japan Automobile Manufacturers Association (JASO) is formed. With respect to each of the brake tubes BT, a tube end processing and a bending processing are implemented. In the tube end processing, the annular portions Rp are formed in the state in which the flare nuts FN are installed on the periphery of the brake tube BT, and in the bending processing bent portions Bp are formed upon the brake tube BT. Due to this, the flare nuts FN are prevented from coming off from the brake tube BT by the annular portions Rp, and by the bent portions Bp that are provided in positions remote from those annular portions Rp.

The First Embodiment

Figure 2:
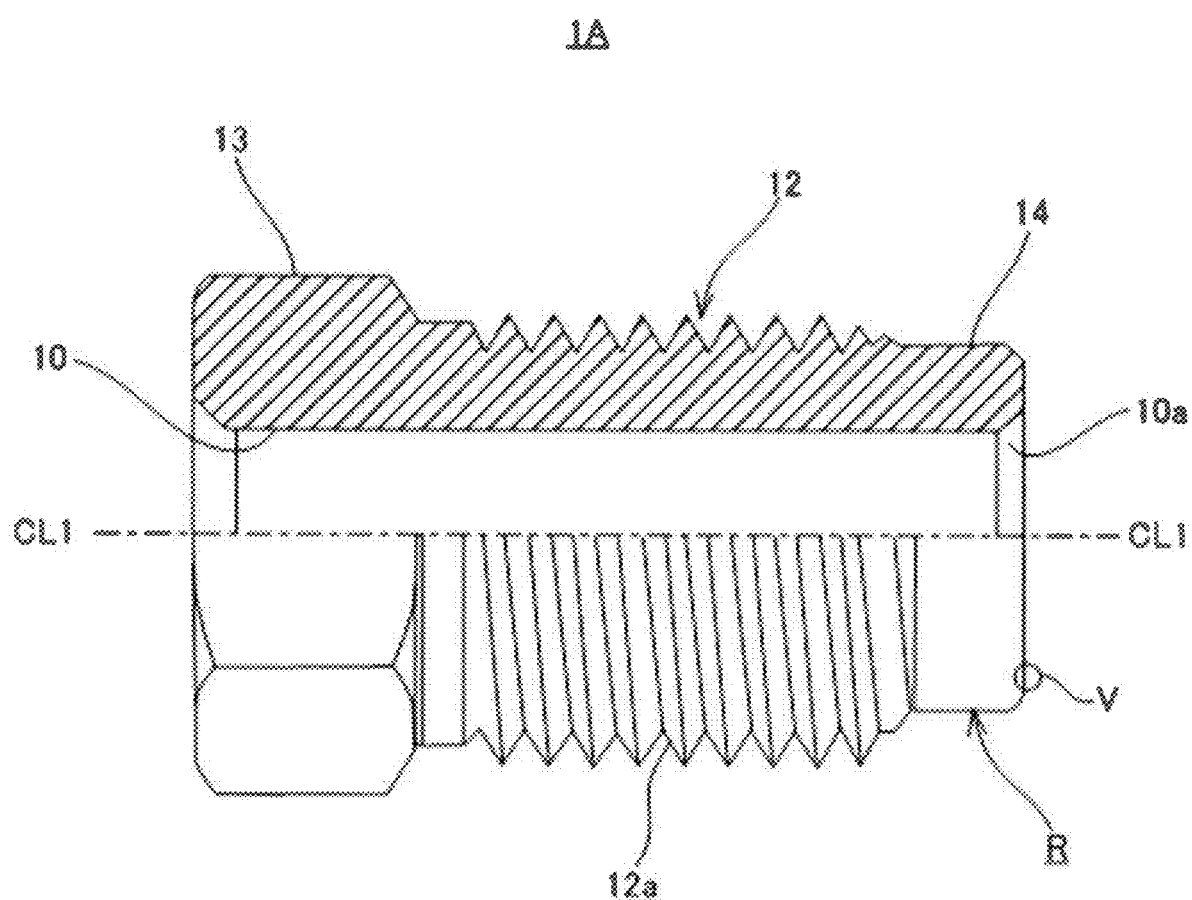
FIG. 2 is a figure showing a flare nut, which is an example of a tube fitting.

FIG. 2 shows a flare nut 1A that is suitable for an ISO flare. This flare nut 1A corresponds to an example of the "tube fitting" of the present invention. The flare nut 1A is a hollow tube fitting that is formed with a through hole 10 through which a tube can be inserted. The flare nut 1A includes a threaded portion 12 upon which an external thread 12a is formed, a head portion 13 that is provided at one end side of the threaded portion 12, and a contact portion 14 that is provided at the other end side of the threaded portion 12. The head portion 13, the threaded portion 12, and the contact portion 14 are all penetrated by the through hole 10 that extends in the direction of the center line CL1. The through hole 10 of the shown flare nut 1A is formed to have an inner diameter that is constant along its axial direction, but this could be varied; for example, instead of this through hole 10, there could be provided a through hole having the shape of a stepped hole whose inner diameter changes at a predetermined location in its axial direction.

Figure 4:
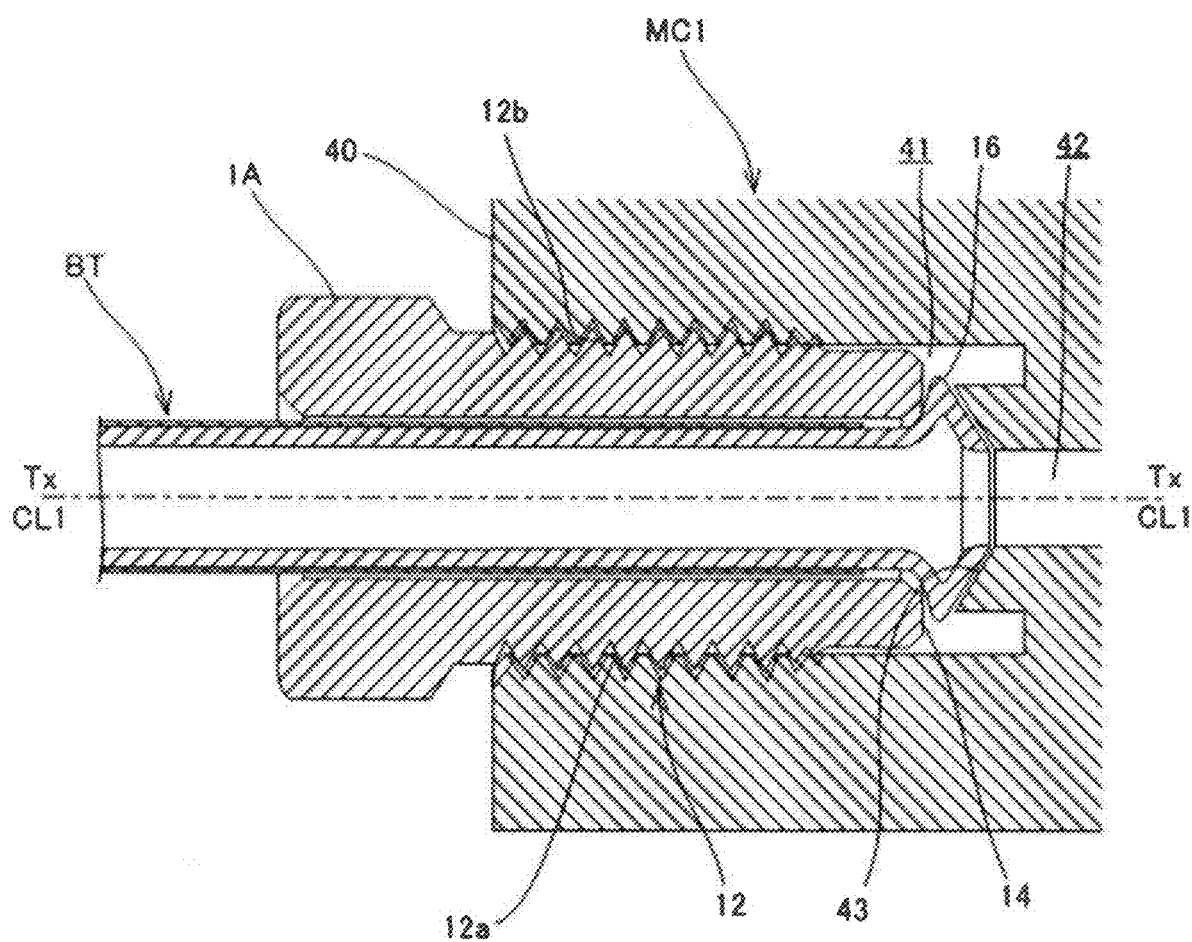
FIG. 4 is a figure showing a state in which a brake tube is coupled to a master cylinder, which is an example of a mating member.

As one example, the external thread 12a formed upon the threaded portion 12 may be a standard ISO metric coarse thread, and is engaged with a corresponding internal thread 12b formed in the mating member (refer to FIG. 4). However, as another example, this external thread 12a could be changed to a metric fine pitch thread according to the same standard. Since the lead angle of a fine pitch thread is small compared to that of a coarse thread, accordingly, by changing to a fine pitch thread, it is possible to provide a flare nut that is less likely to loosen under the same axial force. Moreover, with regard to the size of the threaded portion 12 of the flare nut 1A to be applied to the brake tube BT described above, there is a tendency for the size of the screw employed to be larger, the larger is the outer diameter of the tube to be installed. And, with regard to the size of the threaded portion 12, except in special circumstances, its nominal diameter is generally from M10 to M14, in other words its outer diameter is generally in the range of 10.0 to 14.0 mm. However, if an inch thread is provided upon the flare nut 1A, then a thread with nominal diameter in the range of ⅜" to ½" (around 9.53 to 12.7 mm) is employed. Accordingly, the outer diameter of the external thread 12a that can be employed for the flare nut 1A is in the range of 9.53 to 14.0 mm.

The head portion 13 is a location where a tightening torque is inputted during fastening, and has the shape of a standardized hexagon so that it can be fastened with a conventional tool such as a flare nut wrench or the like. The size of the head portion 13 is selected to match the size of the threaded portion 12, but, unlike the case with the head portion of a standardized bolt, it may be communalized to some extent in order to reduce the number of tool changes.

The contact portion 14 is provided at the end portion of the flare nut 1A along the center line CL1 at the right side of FIG. 2, or, to put it in another manner, is provided at the end portion of the flare nut 1A in the direction of progression of the external thread 12a when the flare nut 1A is being fastened. When the flare nut 1A is being fastened against the mating member, the contact portion 14 has the function of while contacting against an annular portion 16 that is formed as an ISO flare on the brake tube BT (refer to FIG. 3), pressing that annular portion 16 against the mating member. In the case of the flare nut 1A shown in FIG. 2, the contact portion 14 includes a cylindrical portion that extends from the threaded portion 12 to the end of the flare nut 1A. And a chamfered portion 10a is provided at the boundary portion between the contact portion 14 and the through hole 10, and has an inclination of about 45° with respect to the direction of the center line CL1. Due to this chamfered portion 10a, interference between the tube exterior and the flare nut 1A at the time of fastening and stress concentration at the boundary portion between the through hole 10 and the contact portion 14 are mitigated. It should be noted that the chamfered portion 10a has a conical surface in which the ridge lines appearing in a cross section containing the center line CL1 are straight lines. However, instead of this chamfered portion 10a, it would also be acceptable to change this region to a processed portion having a curved surface whose ridge lines consist of curves described by one or a plurality of circular arcs convex toward the center.

The inner diameter of the contact portion 14 is determined by the inner diameter of the through hole 10. If, for example, the outer diameter φ of the brake tube BT is 4.76 mm, then the inner diameter d of the contact portion 14 may be set to 4.98 mm; if the outer diameter φ is 6.0 mm, then the inner diameter d may be set to 6.24 mm; if the outer diameter φ is 6.35 mm, then the inner diameter d may be set to 6.59 mm; and, if the outer diameter φ is 8.0 mm, then the inner diameter d may be set to 8.29 mm. For example, an error of +0.15 mm in the inner diameter d of the contact portion 14 may be permitted. Accordingly, the contact portion 14 employed for the flare nut 1A can have a range of inner diameter d of 4.98 to 8.44 mm.

Figure 3:
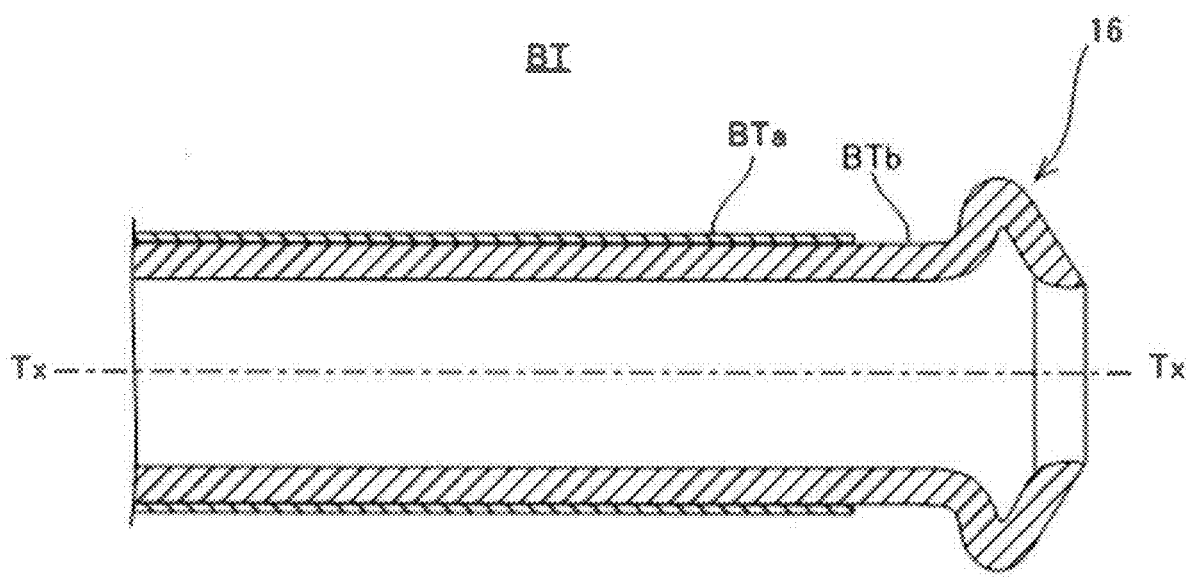
FIG. 3 is a figure showing a brake tube, on whose tube end is formed an ISO flare which is an example of an annular portion.

As shown in FIG. 3, the annular portion 16 is formed at the tube end of the brake tube BT. As one example of a method for forming this annular portion 16, first, a resin coating layer BTa on the brake tube BT is detached from the tube end of the brake tube BT over a predetermined range in the longitudinal direction of the tube axis Tx around its circumferential direction, and then the annular portion 16 made in the shape of an ISO flare is formed upon the end portion of a portion BTb from which the resin coating layer BTa has thus been detached, so as to project in the radially outward direction orthogonally to the tube axis Tx. In some cases, depending upon the nature of the resin material from which the resin coating layer BTa is made, the annular portion 16 may simply be formed upon the end portion of the brake tube BT without particularly detaching the resin coating layer BTa.

As an example of use of this flare nut 1A, a case in which the brake tube BT is coupled to a master cylinder MC1 will now be explained with reference to FIG. 4. The master cylinder MC1, which is an example of a mating member, has a housing 40. An insertion hole 41 is formed in the housing 40, and the brake tube BT is inserted thereinto. The insertion hole 41 opens to the exterior of the housing 40, and its end opposite to its opening portion communicates with a fluid passage 42 formed in the housing 40. The fluid passage 42 opens to the bottom portion 43 of the insertion hole 41. This bottom portion 43 is formed in a recessed shape into the interior side of the housing 40 to match the shape of the annular portion 16 on the brake tube BT. An internal thread 12b that engages with the external thread 12a of the flare nut 1A is formed on the inner peripheral surface of the insertion hole 41 formed in the housing 40.

First, in the state with the flare nut 1A shifted back from the tube end of the brake tube BT, the brake tube BT is inserted so that the annular portion 16 of the brake tube BT abuts the bottom portion 43 of the insertion hole 41. In this state, the flare nut 1A is approached close to the insertion hole 16, so that the external thread 12a of the threaded portion 21 and the internal thread 12b of the housing 40 engage together. When the flare nut 1A is rotated in the fastening direction to a sufficient extent, its contact portion 14 contacts against the annular portion 16. And, when the flare nut 1A is further tightened up while its contact portion 14 is in contact with the annular portion 16, the annular portion 16 is pressed against the bottom portion 43 by the contact portion 14. While the flare nut 1A is thus being tightened, the annular portion 16 is sandwiched between the contact portion 14 and the bottom portion 43, and gradually deforms while transitioning from elastic deformation to plastic deformation. Due to this, the brake tube BT is coupled to the master cylinder MC1 in a liquid-tight manner. The coupling force for the brake tube BT is determined by the maximum axial force that acts during this type of fastening operation.

Figure 5:
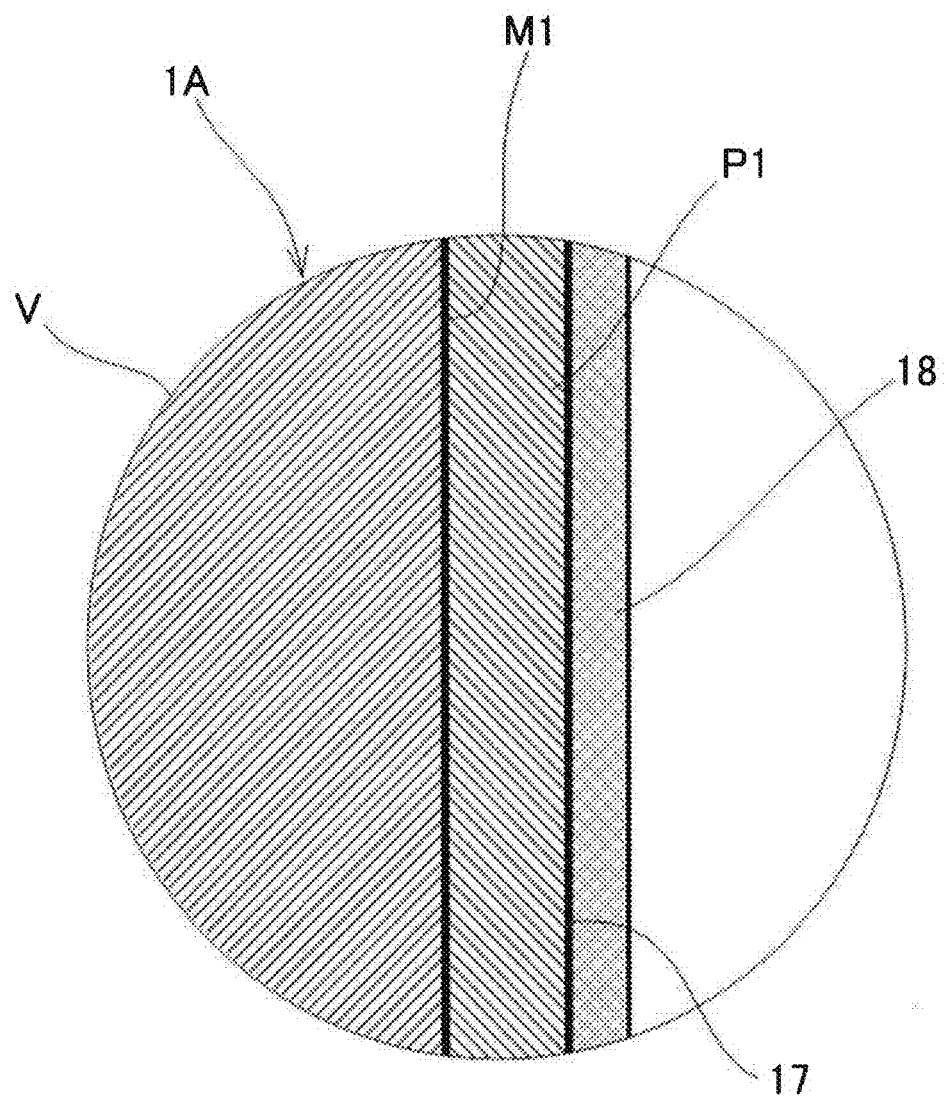
FIG. 5 is an enlarged sectional view of a portion V of FIG. 2.

In order to couple the brake tube BT firmly, as shown in FIG. 5, a resin coating layer 18 is provided upon the flare nut 1A so as to increase or stabilize the axial force when it is fastened. The flare nut 1A has a surface 17 where a zinc based plated layer P1 is formed on a metallic base M1, and the resin coating layer 18 is provided upon this surface 17. This zinc based plated layer P1 is principally provided in order to enhance the corrosion resistance. One of zinc plating, zinc-iron alloy plating, or zinc-nickel alloy plating may be performed in order to form the zinc based plated layer P1. In this embodiment, a zinc-nickel alloy plated layer is provided as the zinc based plated layer P1.

The resin coating layer 18 is formed on, at least, a coated region R that includes the surfaces of the threaded portion 12 and the contact portion 14 (refer to FIG. 2). In this embodiment, the coated region R is set over the entire surface of the flare nut 1A. In other words, the coated region R is set over the surfaces of the threaded portion 12, the head portion 13, and the contact portion 14 of the flare nut 1A, and over the inner circumferential surface of the flare nut 1A which the through hole 10 is pierced through. The resin coating layer 18 is formed by adhering, to the coated region R, a coating material C that includes as components a polyethylene based substance, a lubricant, and solid particles, and whose viscosity is adjusted to a predetermined level. The resin coating layer 18 includes the polyethylene based substance, the lubricant, and the solid particles. For example, polyethylene or a polyethylene copolymer may be selected for the polyethylene based substance. And, for example, one or any combination of polyethylene wax, molybdenum disulfide, graphite, or boron nitride may be selected for the lubricant. The lubricant may be solid, or may be liquid. Moreover, for example, one or any combination of silicon dioxide, silicon nitride, or titanium nitride may be selected for the solid particles.

It would also be acceptable for the resin coating layer 18 to be provided upon the surface 17 where the zinc based plated layer P1 has been subjected to chemical conversion treatment. To put it in another manner, it would be acceptable to arrange for a chemical conversion treatment layer to be present between the zinc based plated layer P1 and the resin coating layer 18. Due to this, the adherence between the surface 17 and the resin coating layer 18 is enhanced. Metallic atoms selected from titanium, zirconium, molybdenum, tungsten, vanadium, manganese, nickel, cobalt, chromium, and lead may be included in this chemical conversion treatment layer. Moreover, some of these metallic atoms may be included in the chemical conversion treatment layer as compounds such as oxides or the like. The chemical conversion treatment layer may be a chromium-free chemical conversion treatment layer. The chemical conversion treatment process for forming the chemical conversion treatment layer may be a reaction type process or an application type process, and may be a trivalent chromium chemical conversion treatment or a chromium-free chemical conversion treatment. It should be understood that the frictional coefficient of the resin coating layer 18 is smaller than the frictional coefficient of the surface 17 where the zinc based plated layer P1 or the chemical conversion treatment layer is formed.

Figure 6:
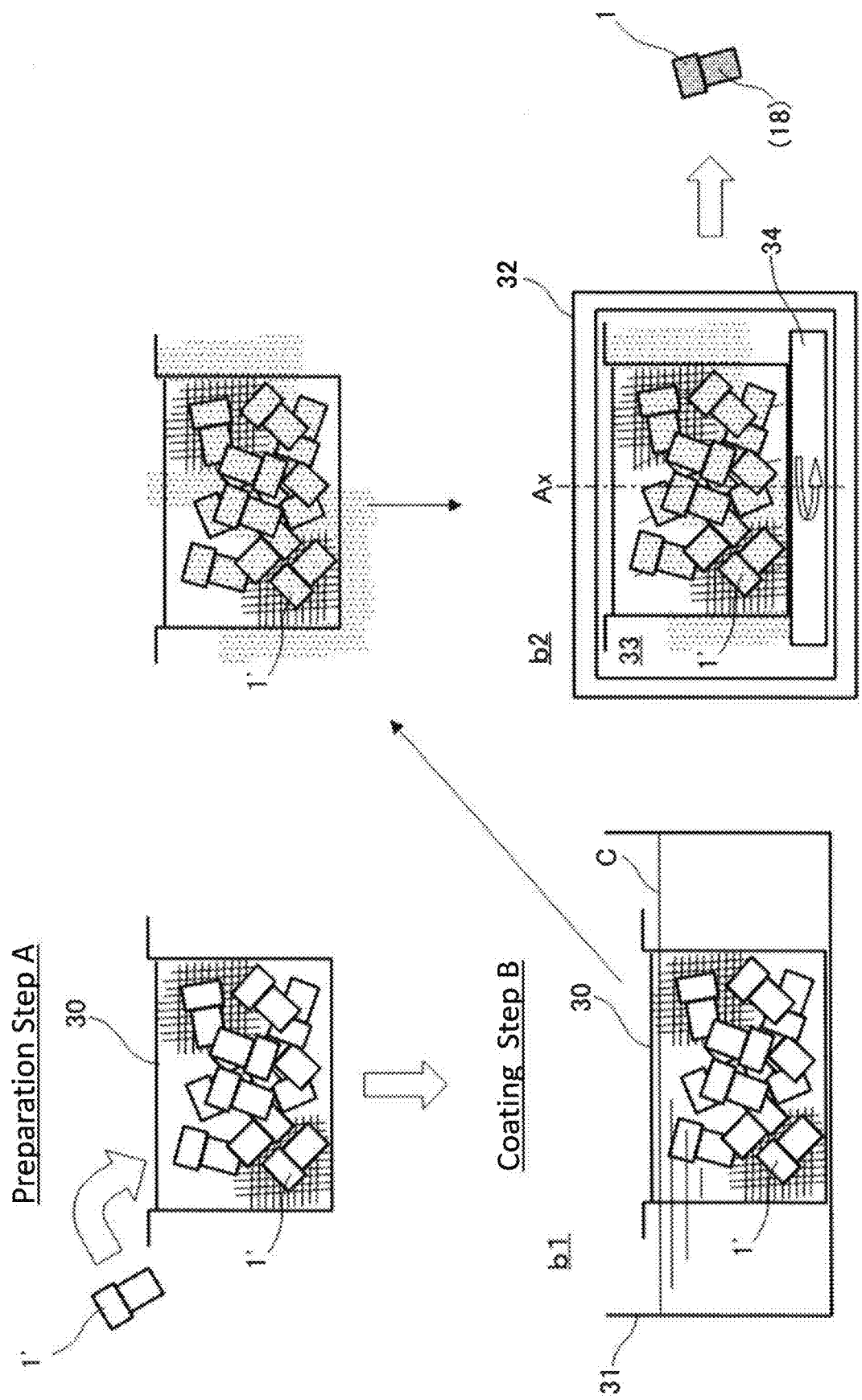
FIG. 6 is a figure showing a summary of a method for formation of a resin coating layer.

One example of a method for forming the resin coating layer 18 will now be explained with reference to FIG. 6. First, in a preparation step A, an untreated nut 1' upon which the plating processing described above has been performed but upon which no resin coating layer 18 is formed is prepared. A plural number of these untreated nuts 1' may be prepared. These prepared untreated nuts 1' are put into a processing basket 30 that has a mesh of a predetermined size. The next coating step B is performed with the untreated nuts 1' held in this processing basket 30.

As one example of the coating step B, a dip coating method may be implemented. The coating step B includes a dipping step b1 of dipping the untreated nuts 1' into a coating material C, and a drying step b2 of drying the coating material C that is adhered to the untreated nuts 1'.

In the dipping step b1, the processing basket 30 containing the untreated nuts 1' is submerged from above into a dipping bath 31 in which coating material C is held to a predetermined level. The dipping bath 31 has the function of regulating the temperature of the liquid held in the dipping bath 31. As one example, the temperature of the coating material C may be regulated to be within the range of 30° C. to 40° C. A sufficient amount of the coating material C is contained in the dipping bath 31 so that it is possible to ignore change of the temperature of the coating material C due to the untreated nuts 1', which are the objects to be processed, being dipped thereinto.

Subsequently, the processing basket 30 that has been submerged into the dipping bath 31 is pulled up out from the dipping bath 31, and then the drying step b2 is implemented. In this drying step b2, the processing basket 30 with the untreated nuts 1' held therein is put into a drier 32. The drier 32 has a processing space 33 whose temperature can be adjusted to be within a predetermined temperature range, and a rotation mechanism 34 that rotates around its axial line Ax while holding the processing basket 30. In this drying step b2, the processing basket 30 held by the rotation mechanism 34 is rotated at a predetermined speed while the temperature within the processing space 33 is held at the predetermined temperature. The rotation mechanism 34 is capable of changing the rotational speed. For example, the rotational speed may be controlled within the range of 100 rpm to 900 rpm. The time period for processing by the drier 32 is set as appropriate. As a result, excess coating material C is dragged off by the centrifugal force of the rotation mechanism 34, and the coating material C that adheres to the coated regions R is dried and fixated. The flare nut 1A provided with the resin coating layer 18 is manufactured by performing this drying step b2.

The thickness of the resin coating layer 18 provided upon the flare nut 1A is controlled. As will be described hereinafter, the thickness of the resin coating layer 18 is understood to be a factor that exerts an influence upon the mechanical characteristics of the flare nut 1A, such as its axial force and so on. Moreover, it is also understood that the thickness of the resin coating layer 18 also exerts an influence upon the corrosion resistance of the flare nut 1A. For example, the thickness of the resin coating layer 18 can be controlled by preparing a coating material C whose viscosity is regulated, and moreover by regulating the temperature of the coating material C when the workpieces (i.e. the untreated nuts) are immersed therein. Furthermore, the thickness of the resin coating layer 18 can also be controlled by, during the drying step b2 described above, regulating the temperature within the processing space 33 and the rotational speed of the rotation mechanism 34. In other words, the parameters that control the thickness of the resin coating layer 18 are the viscosity of the coating material C, the temperature during dipping, the temperature during drying, and the rotational speed of the rotation mechanism 34. It should be understood that, since the thickness of the resin coating layer 18 does not become uniform without any dependence upon the location upon the flare nut 1A, accordingly the thickness of the resin coating layer 18 is quantitatively controlled and managed by employing a mass per unit area that will be described hereinafter as a physical quantity that is correlated with this thickness.

The Second Embodiment

Figure 7:
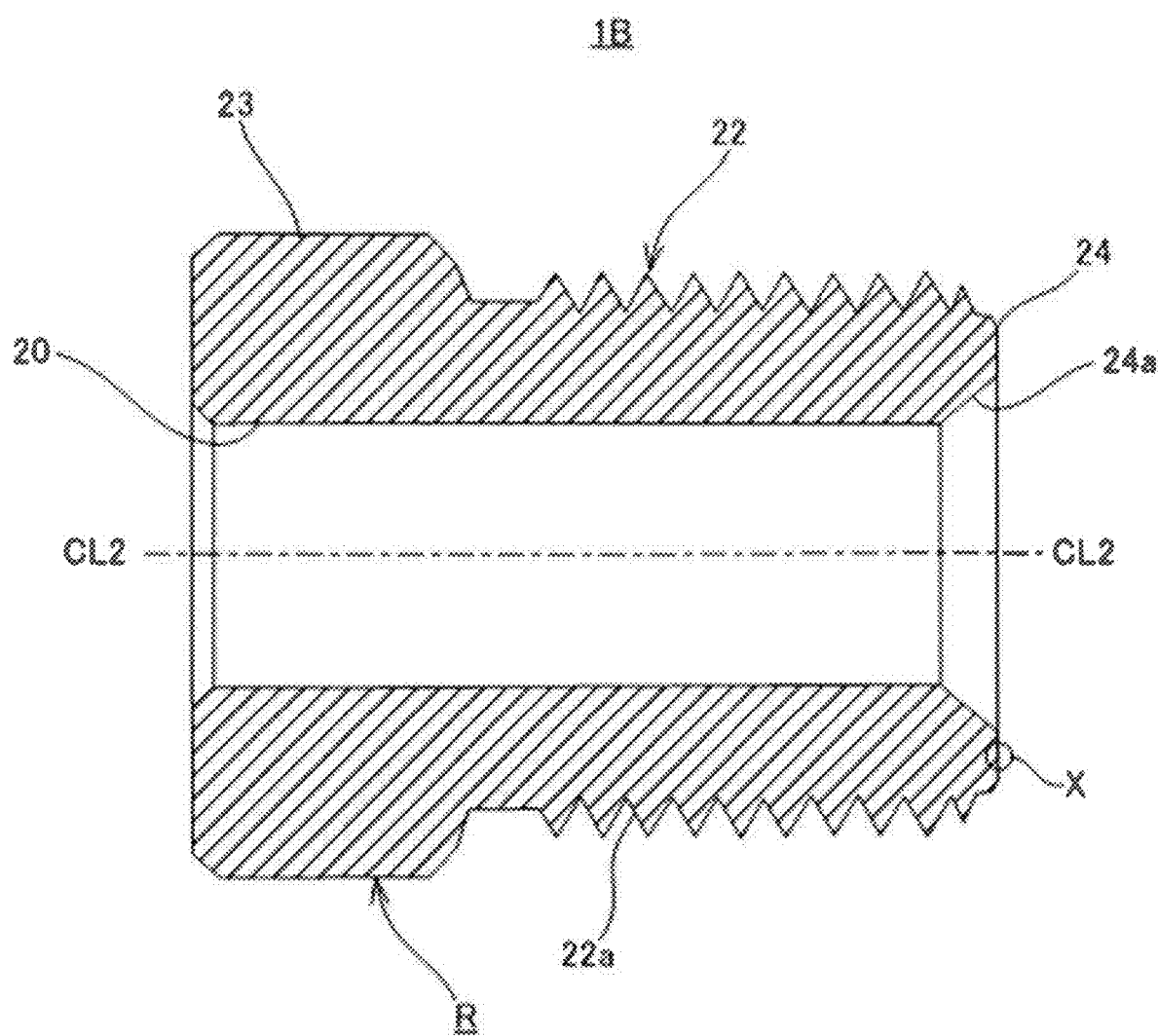
FIG. 7 is a figure showing a flare nut, which is another example of a tube fitting.

FIG. 7 shows a flare nut 1B that is suitable for a double flare (JASO flare). This flare nut 1B corresponds to an example of the "tube fitting" of the present invention. The flare nut 1B is a hollow tube fitting in which is formed a through hole 20 into which a tube can be inserted. The flare nut 1B includes a threaded portion 22 upon which an external thread 22a is formed, a head portion 23 that is provided at one end side of the threaded portion 22, and a contact portion 24 that is provided at the other end side of the threaded portion 22. The head portion 23, the threaded portion 22, and the contact portion 24 are penetrated by the through hole 20 that extends in the direction of the center line CL2. In the case of this flare nut 1B, the through hole 20 is formed to have an inner diameter that is constant along its axial direction, but this could be varied; for example, instead of this through hole 20, there could be provided a through hole having the shape of a stepped hole whose inner diameter changes at a predetermined location in its axial direction.

The external thread 22a formed upon the threaded portion 22 has the same specifications as the external thread 12a provided upon the threaded portion 12 of the flare nut 1A of the first embodiment: the outer diameter of the external thread 22a that can be employed for this flare nut 1B is in the range of 9.53 to 14.0 mm. Moreover, the specification of the head portion 23 is also the same as the specification of the head portion 13 of the flare nut 1A. And the specification of the contact portion 24 is also the same as the specification of the contact portion 14 of the flare nut 1A: the inner diameter d of the contact portion 24 that can be employed for this flare nut 1B is in the range of 4.98 to 8.44 mm.

The contact portion 24 is provided at the end portion of the flare nut 1B along the center line CL2 at the right side of FIG. 7, or, to put it in another manner, is provided at the end portion of the flare nut 1B in the direction of progression of the external thread 22a when the flare nut 1B is being fastened. When the flare nut 1B is being fastening to the mating member, the contact portion 24 has the function of while contacting against an annular portion 26 that is formed as a double flare on the brake tube BT (refer to FIG. 8), pressing that annular portion 26 against the mating member. In the case of the flare nut 1B shown in FIG. 7, the contact portion 24 is provided in the vicinity of the very end of the threaded portion 22, and no clearly defined cylindrical portion like the contact portion 14 of the flare nut 1A is present. However, there also exist some flare nuts suitable for double flare installation with a clearly defined cylindrical portion like the contact portion 14 of the flare nut 1A. The contact portion 24 is provided with a contact surface 24a that is formed as a conical surface having an inclination of about 42° with respect to the axial direction.

Figure 8:
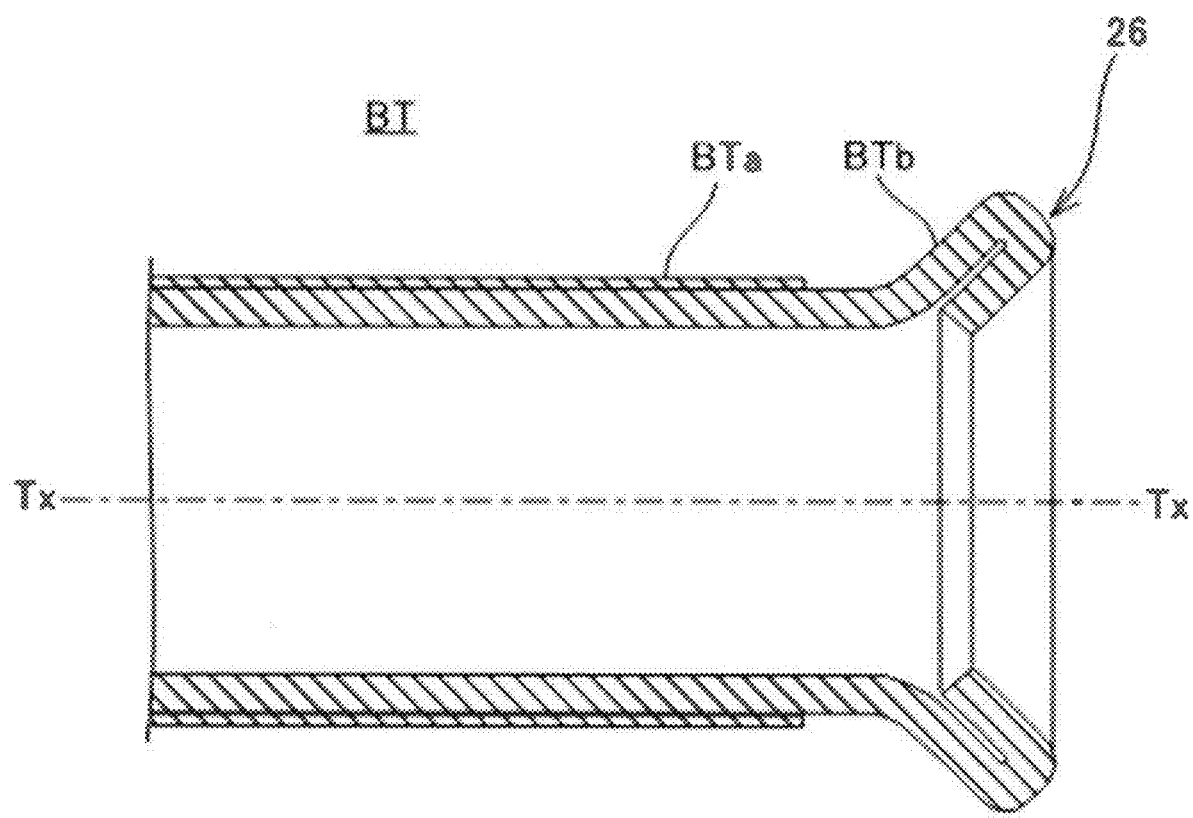
FIG. 8 is a figure showing a brake tube, on whose tube end is formed a double flare which is another example of an annular portion.

As shown in FIG. 8, the annular portion 26 is formed at the tube end of the brake tube BT. As one example of a method for forming this annular portion 26, first, a resin coating layer BTa on the brake tube BT is detached from the tube end of the brake tube BT over a predetermined range in the longitudinal direction of the tube axis Tx around its circumferential direction, and then the annular portion 26 made in a double flare shape is formed upon the end portion of a portion BTb from which the resin coating layer Bta has thus been detached, so as to project in the radially outward direction orthogonally to the tube axis Tx. In some cases, depending upon the nature of the resin material from which the resin coating layer BTa is made, the annular portion 26 may simply be formed upon the end portion of the brake tube BT without detaching the resin coating layer BTa.

Figure 9:
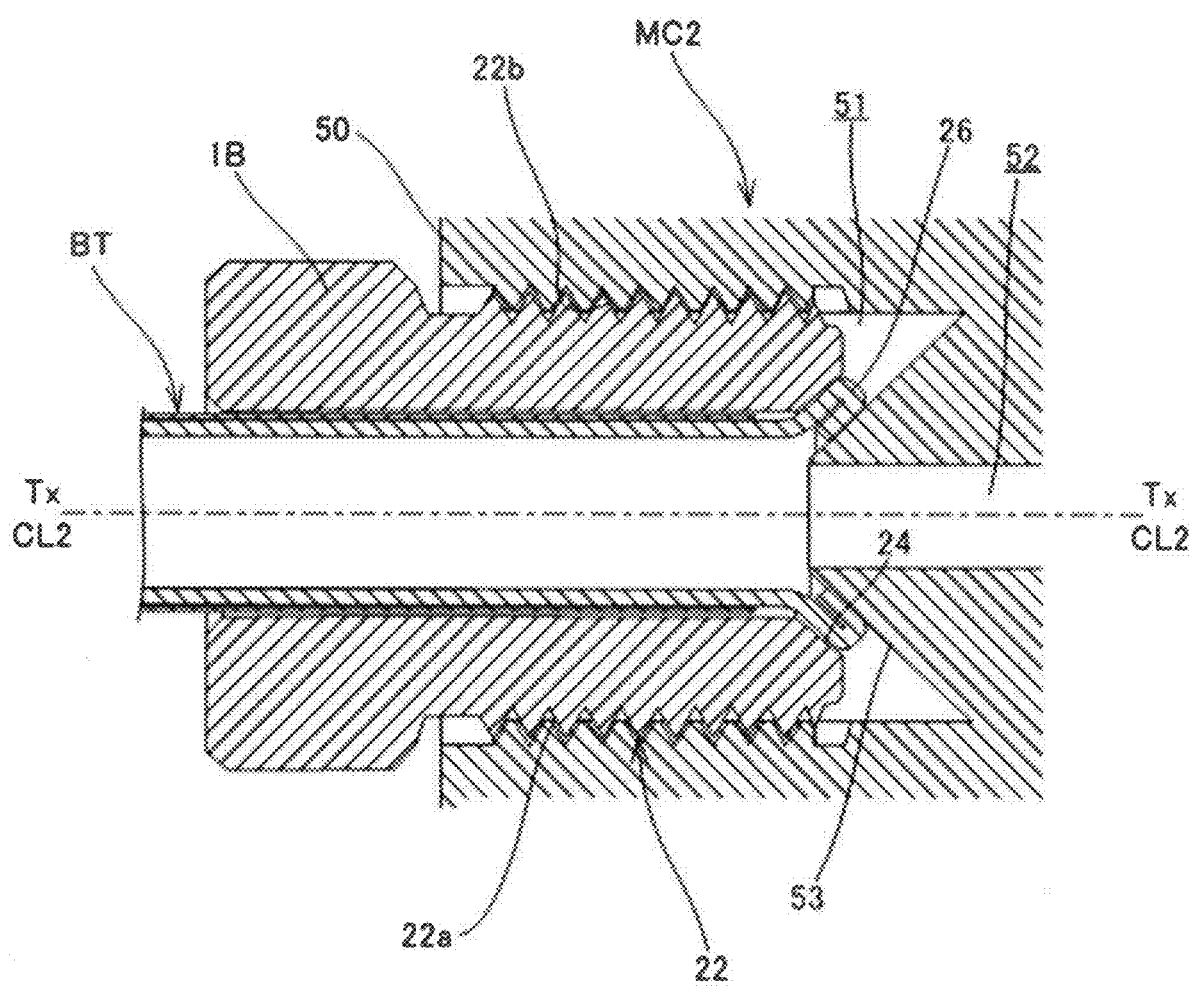
FIG. 9 is a sectional view showing a portion of a master cylinder, which is an example of a mating member to which the brake tube of FIG. 5 is coupled.

An insertion hole 51 having the structure shown in FIG. 9 is formed in a mating member to which the brake tube BT formed with the annular portion 26 is to be coupled. For example, the insertion hole 51 may be formed in a master cylinder MC2, which is an example of such a mating member. The insertion hole 51 opens to the exterior of a housing 50, and its end opposite to its opening portion communicates with a fluid passage 52 formed in the housing 50. The fluid passage 52 opens to the bottom portion 53 of the insertion hole 51. This bottom portion 53 is formed in a shape that projects toward the exterior, so as to match the shape of the annular portion 26 on the brake tube BT. An internal thread 22b that engages with the external thread 22a of the flare nut 1B is formed on the inner peripheral surface of the insertion hole 51 formed in the housing 50. The way in which the brake tube BT is coupled by using the flare nut 1B is the same as in the case described above of the flare nut 1A, and accordingly explanation thereof will be omitted.

Figure 10:
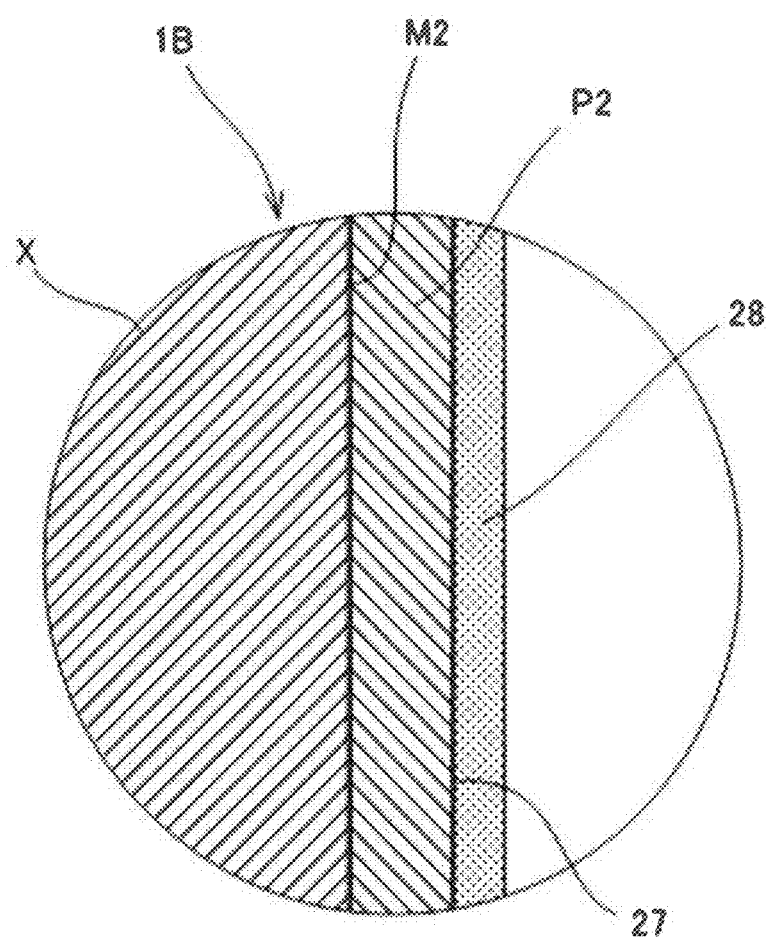
FIG. 10 is an enlarged sectional view of a portion X of FIG. 7.

As shown in FIG. 10, a resin coating layer 28 is provided upon the flare nut 1B. The flare nut 1B has a surface 27 where a zinc based plated layer P2 is formed on a metallic base M2, and the resin coating layer 28 is provided upon this surface 27. This zinc based plated layer P2 is principally provided in order to enhance the corrosion resistance. One of zinc plating, zinc-iron alloy plating, or zinc-nickel alloy plating may be performed in order to form the zinc based plated layer P2. In this embodiment, a zinc-nickel alloy plated layer is provided as the zinc based plated layer P2. And, in a similar manner to the case with the first embodiment, it would also be acceptable to arrange for a chemical conversion treatment layer to be present between the zinc based plated layer P2 and the resin coating layer 28. Moreover, in a similar manner to the case with the first embodiment, the frictional coefficient of the resin coating layer 28 is smaller than the frictional coefficient of the surface 27 where the zinc based plated layer P2 or the chemical conversion treatment layer is formed. The way in which the resin coating layer 28 is formed is the same as in the case of the formation method shown in FIG. 6.

Examples

A: Fastening Tests

By repeatedly fastening the flare nuts 1A and 1B with the same tightening torque and then releasing them, there is a tendency for the axial force at the moment of the tightening-up to decrease along with increase of the number of repetitions. And, from the fastening tests described below, it was found that the thickness of the resin coating layer is a factor affecting the axial force decrease ratio. It should be understood that only the fastening test results obtained for the flare nuts 1A are described below, since no significant difference was found in the test results between the flare nuts 1A and the flare nuts 1B.

1. Test Samples (1) Preparation of the Test Samples

As shown in FIGS. 11A and 11B, coating materials C1 through C4 of four different types were employed for forming resin coating layers upon flare nuts of three different types having different shapes and sizes, and these were classified into groups G1 through G12, so as to result in a total of twelve types. The dip coating method described above was employed as the method for forming the resin coating layers. Each of the groups G1 through G12 includes a plurality of samples having different resin coating layer thicknesses. As described above, the parameters that control the thickness of the resin coating layer are the viscosity of the coating material, the temperature during dipping, the temperature during drying, and the rotational speed of the rotation mechanism provided in the drier. By varying these conditions, a plurality of samples were prepared for each of the groups G1 through G12, the plurality of samples having different resin coating layer thicknesses. The thickness of the resin coating layer was quantified using a parameter mass per unit area w (g/m$^2$) described hereinafter, which correlated with the thickness of the resin coating layer.

(2) Measurement of the Viscosities of the Coating Materials

In preparation of the coating materials, the viscosity of each of the coating materials was measured by the following method.

Equipment used: A rotational viscometer compliant with the ISO 2555:1990 standard.
(Device name: TVB-10M, made by Toki Sangyo Co., Ltd.)
Spindle rotational speed: 60 rpm The viscosity at 25° C. was measured under the conditions described above.

(3) Viscosities of the Coating Materials

The viscosities of the coating materials C1 through C4 at 25° C. were as follows:
Coating material C1: 4.51 mPa·s.
Coating material C2: 5.27 mPa·s.
Coating material C3: 4.25 mPa·s.
Coating material C4: 4.24 mPa·s.

(4) Components of the Coating Materials

Each of the coating materials C1 through C4 contained the polyethylene based substance, the lubricant, and the solid particles described above as common components.

(5) Calculation of the Mass Per Unit Area

The thickness of the resin coating layer correlates with the mass of substance adhering to the coated region. Accordingly, a value mass per unit area w (g/m$^2$) obtained by dividing the difference in mass between a state with the resin coating layer and a state without the resin coating layer by the surface area of the coated region was defined as a physical quantity correlated with the thickness of the resin coating layer. This mass per unit area w was employed for quantifying the thickness of the resin coating layer.

The mass per unit area w was calculated by dividing the mass difference between the mass of the flare nut before the resin coating treatment and the mass of the flare nut after formation of the resin coating layer, by the total surface area of the flare nut. It should be understood that, conversely to the above method, it would also be possible to calculate the mass per unit area w by dividing the mass difference between the mass of the flare nut with the resin coating layer formed thereupon and the mass of the flare nut after removal of the resin coating layer, by the total surface area of the flare nut. As a method for removing the resin coating layer, for example, the method may be employed of dipping the flare nut with the resin coating layer formed thereupon into an organic solvent at high temperature, and then, after it has been dipped, washing the flare nut using an organic solvent separately prepared for washing, and drying it. As the organic solvent into which the flare nut is dipped, for example, an organic solvent that is capable of dissolving polyethylene, such as benzene or decalin or the like, may be employed. The time intervals for this dipping and this drying may be set to such a level that the flare nut from which the resin coating layer has been removed may be identified with the flare nut before the resin coating treatment. For example, the time period for immersion in the organic solvent may be five hours, and, after washing with the organic solvent, the drying time period may be one hour. The flare nut from which the resin coating layer has been removed by the above treatment can be identified with the flare nut before the resin coating treatment.

The total surface area of the flare nut was calculated on the basis of the design drawings for the flare nut, by employing a surface area calculation function incorporated in CAD software. By employing this function, the surface area can be calculated for flare nuts of any desired range.

It should be understood that, although slight discrepancy occurs in the calculated value of the surface area between CAD software, this discrepancy is negligible in the calculation of the mass per unit area w, which is calculated to two places of decimals. Moreover, any discrepancy between the value calculated by CAD software, and a value calculated on the basis of measurement data which is obtained by three-dimensional measurement of the external dimensions of an actual test piece, is at a level that may be ignored, in a similar manner.

(6) Numbering of the Samples

As shown in FIGS. 11A and 11B, sample numbers #101 to #421 were assigned to the samples, in order to distinguish them from one another. It should be understood that the first digit of the sample number was assigned so as to correspond to the type of its coating material C1 through C4.

2. The Fastening Test Method (1) An Axial Force Measurement Device

Figure 12:
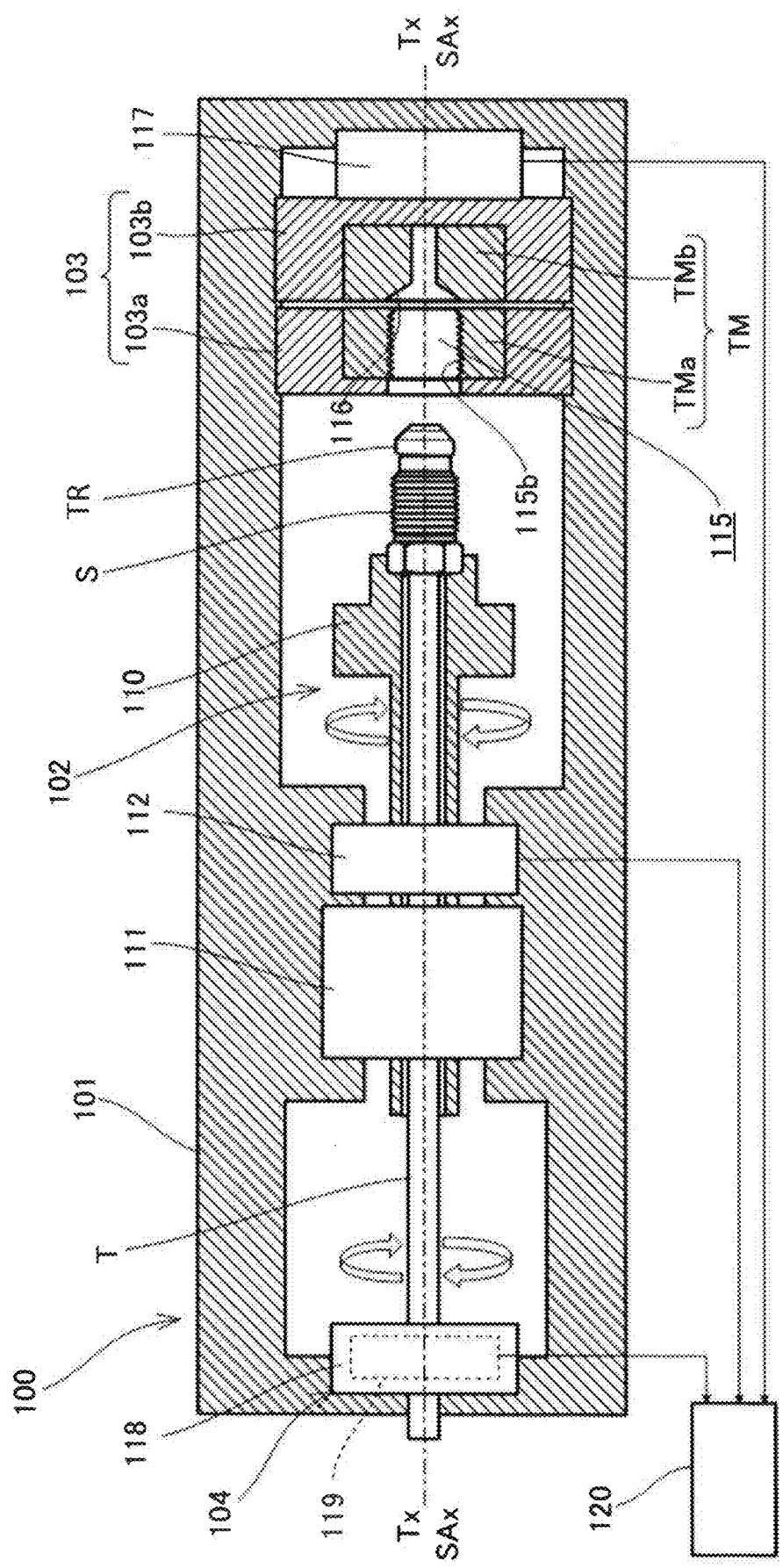
FIG. 12 is a figure showing the structure of an axial force measurement device.

The axial force measurement device shown in FIG. 12 was employed for measuring the axial force of each of the samples. FIG. 12 schematically shows the structure of this axial force measurement device 100. A testing tube T, which corresponds to the brake tube BT, is set into the axial force measurement device 100. The testing tube T is mounted in the axial force measurement device 100 so that the axis Tx of this tube and a reference axis SAx coincide. A sample S of a flare nut is installed upon the testing tube T, and a testing annular portion TR is formed at the end of the testing tube T. The axial force measurement device 100 then performs tightening operation upon the sample S until a predetermined tightening torque is reached, and thereby couples the testing tube T to a testing member TM, which corresponds to the mating member. And the axial force measurement device 100 measures the axial force and other physical quantities with respect to the sample S during the tightening operation.

The axial force measurement device 100 includes a frame 101, and, as one example, this frame 101 is installed on the floor portion or the like of a test room. Each of a tightening actuation unit 102 that performs a tightening operation upon the sample S, a mating member holding unit 103 that holds the testing member TM, and a tube holding unit 103 that holds the testing tube T is provided to the frame 101 of the axial force measurement device 100. The tightening actuation unit 102, the mating member holding unit 104, and the tube holding unit 104 are provided to the frame 101 so as to be aligned along the direction of the reference axis SAx.

The tightening actuation unit 102 includes a tool 110 that is fitted to the head portion of the sample S, a motor 111 that rotationally drives the tool 110 around the reference axis SAx, and a tightening torque sensor 112 that outputs a signal corresponding to the rotational drive resistance of the tool 110.

The mating member holding unit 103 holds the testing member TM in a first jig 103a and a second jig 103b that are separated in the direction of the reference axis SAx. The testing member TM is separated in the direction of the reference axis SAx, with one first part TMa thereof being held in the first jig 103a and another second part TMb thereof being held in the second jig 103b. The first part TMa has a screw hole 115 in which is formed an internal thread 115b that engages with the external thread on the sample S. And the second part TMb has a bottom portion 116 against which the testing annular portion TR of the testing tube T is pressed. When the screw hole 115 and the bottom portion 116 are abutted against one another concentrically, a hole shape equivalent to the insertion holes 41, 51 described above is defined. The first jig 103a and the second jig 103b can hold the screw hole 115 of the first part TMa and the bottom portion 116 of the second part TMb so that they abut one another concentrically. The first jig 103a is fixed to the frame 101. On the other hand, movement of the second jig 103b in the direction of the reference axis SAx is restricted in a state that the first part TMa and the second part TMb abut one another, and a load cell 117 is interposed between the second jig 103b and the frame 101 of the axial force measurement device 100.

The tube holding unit 104 includes a fixing mechanism 118 that clamps to a fixed position set at a predetermined distance (for example 0.3 m) from the end of the testing tube T, and a co-rotation torque sensor 119 that outputs a signal corresponding to the torque around the reference axis SAx generated upon the fixing mechanism 118.

When the tightening operation is performed upon the sample S by the tightening actuation unit 101, the sample S engages with and screws into the internal thread 115b formed upon the first part TMa of the testing member TM, and the testing annular portion TR is pushed against the bottom portion 116 formed on the second part TMb. Due to this, a force is applied between the first part TMa and the second part TMb to pull them apart from one another in the direction of the reference axis SAx. Due to the fact that the first part TMa is held in the first jig 103a which is fixed to the frame 101, it cannot shift in the direction of the reference axis SAx, while, due to the fact that the second part TMb is held in the second jig 103b, it is restricted from movement in the direction of the reference axis SAx by the load cell 117 which is interposed between the second jig 103b and the frame 101. Thus, since the load imposed upon the second part TMb corresponds to the reaction force of the axial force upon the sample S, accordingly the value detected by the load cell 117 can be treated as the measured value of the axial force. In other words, the axial force of the sample S can be measured directly on the basis of the output signal of the load cell 117, without employing any calculation founded upon the tightening torque. The signals from the tightening torque sensor 112, the load cell 117, and the co-rotation torque sensor 119 are inputted to a control device 120. As one example, the control device 120 may be a personal computer. The control device 120 performs predetermined processing upon the input signals from the sensors, and stores as measurement results. data in which the axial force and the co-rotation torque are associated with the tightening torque inputted to the sample S, and moreover, according to requirements, may output those measurement results to an output device, for example to a display or the like.

(2) The Testing Method

Using the axial force measurement device 100 shown in FIG. 12, an unused sample S was installed upon an unused testing tube T and the tightening operation above described above was performed, and thereafter release operation was performed by loosening the fastening of the sample in the tightening actuation unit 102 and by releasing the coupling of the testing tube T to the testing member TM. It was determined that the coupling of the testing tube T was released when the value detected by the load cell 117 returned to its initial value (for example 0.0 kN). As one example, the tightening torque during fastening by the tightening actuation unit 102 may be set to a value within the range of 12.0 Nm to 22.0 Nm, for example to 17.0 Nm. The operation described above was the first fastening test, and similar fastening test (without exchanging the testing tube T and the sample S) including the tightening operation, the measurement of the axial force and so on, and the release operation was repeated a total of five times. In each fastening test, the axial force and the co-rotation torque measured by the axial force measurement device 100 were acquired and recorded as measurement values. The interval between the fastening tests was, for example, 60 seconds.

It should be understood that the number of times the fastening test was repeated was determined on the basis of a limit for the number of times that the brake tube of an automobile is likely to be taken off and replaced during the entire period of time from when the automobile is new until it is finally scrapped. Although the chance for the brake tube of an automobile to be taken off does not occur frequently, this limit was estimated on the basis of a discrete probability distribution with the number of times of removal being a random variable. Here, three elements, that are the ABS unit, the master cylinder, and the brake unit, were supposed to be the mating members to which the brake tube is coupled, and, under the assumption that the brake tube and the flare nut must necessarily be re-used in the event of a fault in any one of these three elements, the probability of the occurrence of a fault in any of these elements, the number of coupling points of the brake tube, the average value of the time period from when the vehicle is new to when it is finally scrapped, and other parameters were considered. Based upon the above, it was considered that the probability of a brake tube being taken off six times or more than six times was so low as to be negligible. Accordingly, the number of times the fastening test was repeated was set to be less than six times, i.e. five times.

(3) The Axial Force Decrease Ratio

As a parameter for evaluation of the change of axial force due to repeated engagement testing performed upon the same flare nut, the axial force decrease ratio α (kN/turn) is defined by the following Formula (1):

$$\alpha = -(F_n - F_1)/(n-1) \quad (1)$$

Here $F_1$ (kN) is the initial axial force, which is the maximum axial force that is generated during the first fastening test. And $F_n$ (kN) is the n-th axial force, which is the maximum axial force that is generated during the n-th fastening test (where 1<n<6). However, Formula (1) is conditional upon the condition that the relation $0<F_n<F_{n-1}$ is satisfied, where the (n−1)-th axial force that is generated during the (n−1)-th fastening test is $F_{n-1}$. Accordingly, α>0.

Since, as described above, in this testing the total number of repetitions was less than six, i.e. was five, accordingly the above Formula (1) that defines the axial force decrease ratio α may be rewritten as the following Formula (1'), with the axial force during the fifth test being $F_5$:

$$\alpha = -(F_5 - F_1)/4 \quad (1')$$

3. Test Results and Evaluation

The results of the fastening tests conducted as described above are shown in FIGS. 13A and 13B.

(1) The Evaluation Standard

Each of the samples was evaluated according to the following Reference Standards a and b, on the basis of the mechanical characteristics of the flare nuts. Reference Standard "a": The initial axial force $F_1$ is less than 14.0 kN. Reference Standard "b": The axial force decrease ratio α is less than 1.75 kN/turn.

Reference Standard "a" stipulates the upper limit value of the initial axial force $F_1$. This upper limit value is determined on the basis of the upper limit value for the co-rotation torque. This upper limit value for the co-rotation torque is determined in consideration of the strength of the tube and the vibration of the vehicle, and, for example, may be 1.0 Nm. The co-rotation torque and the axial force are correlated, and the axial force that corresponds to the upper limit value of the co-rotation torque is uniquely determined. This axial force, for example, may be 14.0 kN. The co-rotation torque is maximum at the time of first fastening accompanying plastic deformation of the annular portion formed upon the tube and is reduced when the flare nut is re-used, but does not tend further to change much in dependence upon the number of times of further re-use. Accordingly, due to the axial force matching Reference Standard "a", it is guaranteed that the co-rotation torque will be less than the upper limit value even when the flare nut is re-used. It should be understood that the lower limit value of the initial axial force $F_1$ is set so that it is possible to ensure the required coupling force for the tube, even if the axial force decreases when the flare nut is re-used. For example, it is preferable for the lower limit value for the initial axial force $F_1$ to be 10.0 kN, more preferable for it to be 11.0 kN, and yet more preferable for it to be 12.0 kN. In other words, it is preferable for the initial axial force $F_1$ to satisfy $10.0<F_1<14.0$, more preferable for it to satisfy $11.0<F_1<14.0$, and yet more preferable for it to satisfy $12.0<F_1<14.0$.

Reference Standard "b" stipulates the upper limit value of the axial force decrease ratio α. If, as one example, the axial force decrease ratio α is greater than or equal to 1.75 kN/turn, then, upon re-use, the axial force will often drop below the lower limit value even if the flare nut is fastened with the same tightening torque as when it was fastened for the first time. The lower limit value of this axial force is set on the basis of the lower limit value for the coupling force required for the brake tube. By conforming to Reference Standard "b", it is possible to avoid the axial force dropping below the lower limit value even if, upon re-use of the flare nut, it is fastened with the same tightening torque as when it was fastened for the first time. This ensures the appropriate coupling force required for the brake tube even when the flare nut is re-used. It should be understood that the smaller is the axial force decrease ratio α, the better, provided that α>0.

(2) The Results of Evaluation

The results of evaluation are shown in FIGS. 14A and 14B. In these figures, the samples are arranged in order from the smallest mass per unit area w to the largest, and passed samples that conform both to Reference Standard "a" and Reference Standard "b" and rejected samples for which at least one of these Reference Standard "a" and Reference Standard "b" is not met are shown together. In FIGS. 14A and 14B, with respect to respective Reference Standard "a" and Reference Standard "b", cases for which the corresponding standard is met are shown by "y", while cases for which the corresponding standard is not met are shown by "n". Moreover, cases for which both Reference Standard "a" and Reference Standard "b" are met are shown by "YES", while cases for which at least one of Reference Standard "a" or Reference Standard "b" is not met are shown by "NO".

(3) Considerations

As can be understood from FIGS. 14A and 14B, whether Reference Standard "a" or Reference Standard "b" is or is not met depends upon the mass per unit area w, irrespective of differences in the coating material. As the mass per unit area w increases, generally there is a tendency for the initial axial force $F_1$ to increase and for the axial force decrease ratio α to decrease. Conversely, as the mass per unit area w decreases, generally there is a tendency for the initial axial force $F_1$ to decrease and for the axial force decrease ratio α to increase. However, it has been found that, if the mass per unit area w is too large, then Reference Standard "a" is not met, while, if the mass per unit area w is too small, then Reference Standard "b" is not met. When the passed samples are reviewed, it is found that the mass per unit area w of the passed samples is within the range $0.79<w<10.07$. The lower is the initial axial force $F_1$, the more it is possible to reduce damage to the tube while ensuring the required coupling force for the tube. Furthermore, when mass production of the flare nuts is considered, it is beneficial in terms of production cost to keep the amount of coating material used as small as possible. Accordingly, when not only the mechanical characteristics but also damage to the tube and the production costs of the flare nuts are considered, it is preferable for the upper limit value of the mass per unit area w to be, for example, less than 9.00 g/m², more preferable for it to be less than 7.50 g/m², and even more preferable for it to be less than 6.00 g/m². In other words, for the mass per unit area w, $0.79<w<9.00$ is preferable, $0.79<w<7.50$ is more preferable, and $0.79<w<6.00$ is even more preferable.

If the mass per unit area w is within any of the ranges described above, the mechanical characteristics required for the flare nut are satisfied. However, it has been found that, if the mass per unit area w is too low, although the mechanical characteristics for the flare nut are satisfied, there is a problem with the corrosion resistance of the flare nut when it is re-used.

B: Corrosion Tests

Therefore, the relationship between the corrosion resistance of the flare nuts and the mass per unit area w was checked by corrosion testing.

Preparation of the Samples

A predetermined number of flare nuts were prepared to perform the fastening test mentioned above upon the flare nuts and test sample groups for which different numbers of trials were performed were created in the following manner. The predetermined number of flare nuts having the same dimensions and shapes but with different values of mass per unit area w were prepared, and the fastening test described above was performed upon these flare nuts. By way of example, there were prepared a first-time sample group with which the fastening test described above was performed once and then the testing tube was taken off, a third-time sample group with which the fastening test described above was performed three times and then the testing tube was taken off, and a fifth-time sample group with which the fastening test described above was performed five times and then the testing tube was taken off. And, as a comparative example, an unused comparative sample group of flare nuts was prepared having the same dimensions and shapes as the above test sample groups, but different values of mass per unit area w.

Testing Method and Results

Corrosion testing was performed for each of the test sample groups and the comparison sample group. This testing conformed to the SST (Salt Spray Test) stipulated by JASO 104-86. To summarize the test results, the relationship between corrosion resistance and mass per unit area shown in FIG. 15 was found. The time period (in hours) from the start of the test to the development of white rusting, which indicates the corrosion resistance of the flare nut, is shown along the vertical axis in FIG. 15. And the mass per unit area w, which is correlated with the thickness of the resin coating layer, is shown along the horizontal axis in FIG. 15.

Considerations

Figure 15:
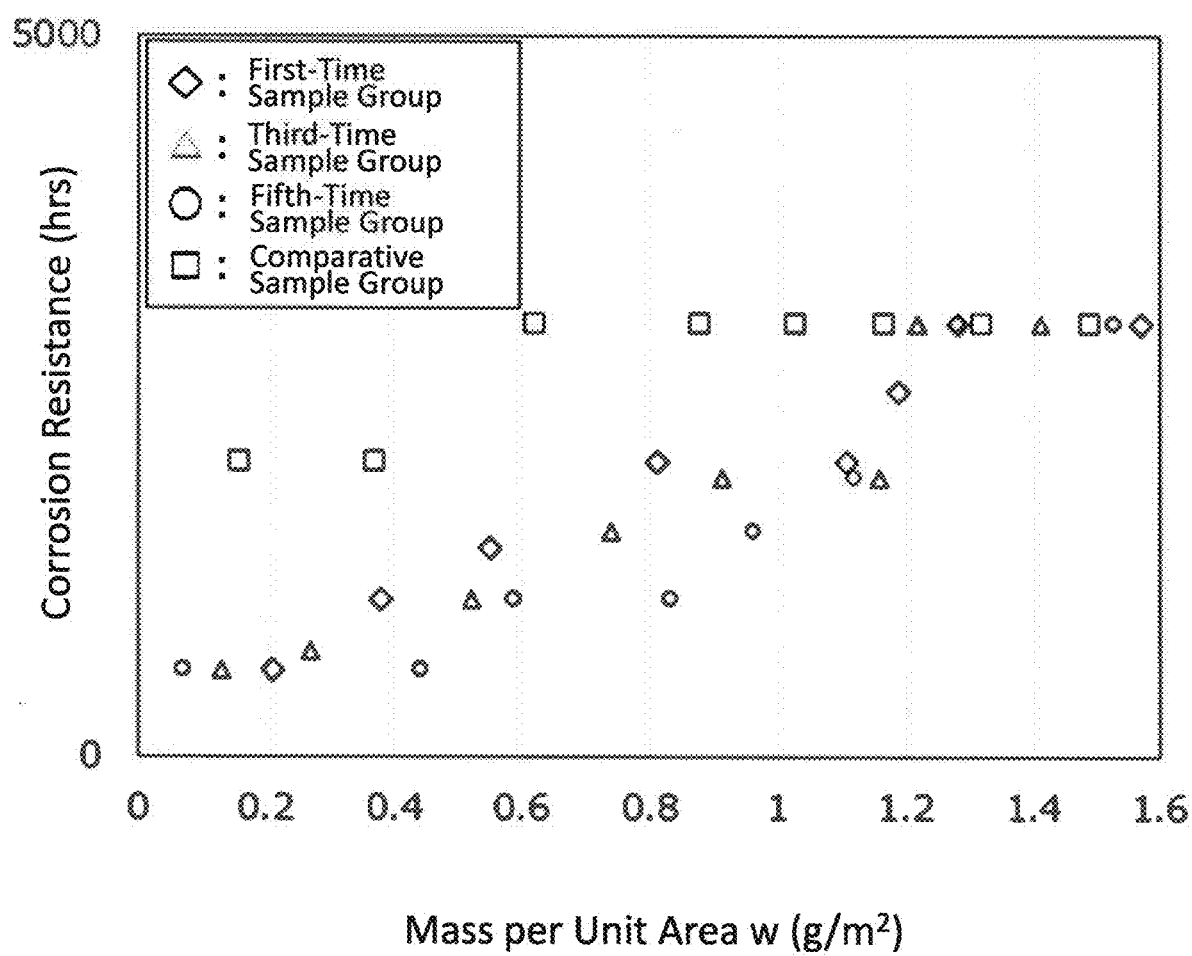
FIG. 15 is a figure showing a relationship between mass per unit area and corrosion resistance.

As shown in FIG. 15, it will be understood that the overall corrosion resistance tendency was for the corrosion resistance to be enhanced, the greater was the mass per unit area w. And, when each test sample group is compared with the comparison sample group, it is seen that, in the regions where the mass per unit area w was 1.20 or less, there was a tendency for white rust to develop in shorter time periods for each of the test sample groups as compared with the comparison sample group, even though they had the same level of mass per unit area w. In other words, in the regions where the mass per unit area w was 1.20 or less, the corrosion resistance was reduced due to re-use. Moreover, when the test sample groups in the same regions are compared with one another, there is a tendency for the corrosion resistance to be lower, the greater was the number of repetitions. These tendencies were prominent when the mass per unit area w is in the range of 0.40 to 1.00.

On the other hand, it will be understood that, in the regions where the mass per unit area w was greater than 1.20, there was no significant difference in the corrosion resistance with respect to the mass per unit area w for the test sample groups and the comparison sample group. In other words, in the regions where the mass per unit area w was greater than 1.20, the corrosion resistance did not change according to the number of times of re-use. Accordingly, if the mass per unit area w is greater than 1.20, then it is possible to ensure a corrosion resistance when the flare nut is re-used that is equivalent to the corrosion resistance when it is used for the first time. It should be understood that, while it is possible to ensure a corrosion resistance equivalent to when the flare nut is used for the first time if the mass per unit area w is greater than 1.20, it is preferable for the mass per unit area w to exceed 1.50 in order reliably to obtain corrosion resistance that is not inferior to the corrosion resistance at the time of first use, it is more preferable for the mass per unit area w to exceed 1.80, and it is even more preferable for it to exceed 2.00.

C: Summary

By combining the results of the fastening tests and the results of the corrosion resistance testing described above it is found that, in order to ensure corrosion resistance of the flare nut upon re-use equivalent to the corrosion resistance at the first use while still satisfying requirements for the mechanical characteristics of the flare nut, it is preferable that the following conditions are satisfied: the condition obtained by the fastening tests is $0.79 < w < 10.07$, and the condition obtained by the corrosion resistance tests is $1.20 < w$. Accordingly, in relation to the mass per unit area w, at least the following Formula (2) is satisfied:

$$1.20 < w < 10.07 \qquad (2)$$

The present invention is not limited to the embodiments described above; it may be implemented in various forms. In the embodiments described above, the flare nuts were used upon brake tubes made from metal, but the subject for use of the flare nuts is not limited to being brake tube. For example, tubes of various types made from metal, such as vapor tubes or the like, may also be employed as subjects. Each of the flare nuts 1A, 1B is only an example of a tube fitting that is used for coupling to a metallic tube. The present invention can also be applied to flare nuts having shapes different from those shown in the figures, provided that the external thread has an outer diameter of 9.53 through 14.0 mm and the contact portion has an inner diameter of 4.98 through 8.44 mm.

The coated region R according to the embodiments described above are provided upon the entire surfaces of the flare nut, in other words upon the entire surfaces of the threaded portion, of the head portion, and of the contact portion, and upon the entire inner circumferential surface of the flare nut which a through hole is pierced through. However, the fact that the coated region is provided over these entire surfaces is only an example. For example, the coated region may be limited to being provided only upon the surface of the threaded portion and upon the surface of the contact portion. In this case, the inner circumferential surface of the flare nut which a through hole is pierced through and the surface of the head portion are excluded from the coated region. Furthermore, the coated region may not be always set upon the entire surfaces of the threaded portion and the contact portion. For example, the coated region might be set only upon portions of the surfaces of the threaded portion and the contact portion. In this case, for example, the coated region could preferably be set upon an at least 40% portion of the surface of the threaded portion, more preferably could be set upon an at least 60% portion thereof, and even more preferably could be set upon an at least 80% portion thereof. Moreover, for example, the coated region could preferably be set upon an at least 40% portion of the surface of the contact portion, more preferably could be set upon an at least 60% portion thereof, and even more preferably could be set upon an at least 80% portion thereof. As described above, by the surface of the threaded portion is meant the surface of the range over which the screw thread is formed that is actually engaged with the internal screw thread of the mating member, or that is scheduled to be engaged with that internal screw thread. Furthermore, by the surface of the contact portion is meant the contact surface that is actually in contact with the annular portion, or that is scheduled to be in contact with the annular portion.

The embodiments described above are only examples in which the resin coating layer 18 is provided upon the surface 17 upon which the zinc based plated layer P1 is provided, and in which the resin coating layer 28 is provided upon the surface 27 upon which the zinc based plated layer P2 is provided. However, for example, it would also be possible to implement the present invention by employing a metallic substrate upon which no chemical surface processing such as plating or the like has been performed as the surface of a tube fitting, and by providing a resin coating layer upon that surface. Even with this arrangement, the frictional coefficient of the resin coating layer will be smaller than the frictional coefficient of the surface of the metallic substrate.

Inventions that can be specified from the embodiments and variant embodiments explained above are described below.

A tube fitting according to an aspect of the invention disclosed is a tube fitting that is capable of coupling a tube made from metal and provided with an annular portion upon an end portion thereof, to a mating member by being installed upon the external periphery of the tube and by being fastened to the mating member in the state of contacting the annular portion, the annular portion projecting in the radially outward direction from the tube, the tube fitting including a threaded portion upon which is formed an external thread that engages with an internal thread provided in the mating member; a contact portion that is provided at the end portion of the tube fitting in the direction of progression of the external thread when the tube fitting is being fastened, and that, when the tube fitting is fastened to the mating member, contacts the annular portion to press the annular portion against the mating member; and a resin coating layer provided over a coated region that includes the surfaces of the threaded portion and the contact portion; and wherein: a through hole extending in a direction parallel to the direction of progression is pierced through both the threaded portion and the contact portion; the external thread has an outer diameter of 9.53 to 14.0 mm, and the contact portion has an inner diameter of 4.98 to 8.44 mm; the resin coating layer includes a polyethylene based substance, a lubricant, and solid particles; and, when mass per unit area w (g/m$^2$) is defined as being a value obtained by dividing the mass difference between a state with the resin coating layer and a state without the resin coating layer by the surface area of the coated region, the mass per unit area w satisfies a relation $0.79<w<10.07$.

According to the above aspect, the relation $0.79<w<10.07$ is satisfied with respect to the mass per unit area w which correlates with the thickness of the resin coting layer provided to the tube fitting, and accordingly, in a case that fastening and release are repeated, it is possible to obtain an initial axial force which keeps a co-rotation torque less than the upper limit value, and moreover it is possible to keep the axial force decrease ratio low.

In the above aspect, a relation $1.20<w<10.07$ may be satisfied with respect to the mass per unit area w. According to this aspect, in a case that fastening and release are repeated, it is possible to obtain an initial axial force which keeps a co-rotation torque less than the upper limit value, and moreover it is possible to keep the axial force decrease ratio low; and furthermore it is possible to ensure a corrosion resistance during re-use of the tube fitting that is equivalent to the corrosion resistance upon first use.

In the above aspect, a relation $0.79<w<9.00$, a relation $0.79<w<7.50$, or a relation $0.79<w<6.00$ may be satisfied with respect to the mass per unit area w. When mass production of flare nuts is considered, it is beneficial in terms of production cost that the smaller the upper limit of the mass per unit area w is, the smaller the amount of coating material used becomes.

In the above aspect, when a testing member corresponding to the mating member and a testing tube having the same outer diameter as the tube and having a testing annular portion corresponding to the annular portion are prepared, and when a fastening test is repeated n times (where $1<n<6$), the fastening test including: fastening operation to fasten the tube fitting to the testing member with a predetermined tightening torque in the state in which the contact portion is contacted against the testing annular portion; and release operation to release the coupling of the testing tube from the testing member by loosening its fastening state after the tightening operation, if the maximum axial force generated in the first performance of the fastening test is termed the initial axial force $F_1$ (kN) and the maximum axial force generated in the n-th performance of the fastening test is termed the n-th axial force $F_n$ (kN), and if a value obtained by $-(F_n-F_1)/(n-1)$ is defined as being the axial force decrease ratio $\alpha$ (kN/turn), then the axial force decrease ratio $\alpha$ satisfies a relation $0<\alpha<1.75$. Since, according to this aspect, the relation $0<\alpha<1.75$ may be satisfied for the axial force decrease ratio $\alpha$. According to this aspect, it is possible to suppress decrease of the axial force upon re-use, and it is possible to obtain the desired coupling force during reuse even though the tube fitting is fastened with a tightening torque that is the same as that employed upon first use.

Further, the tube may be a brake tube that is employed as a brake conduit for an automobile, and, when the predetermined tightening torque is in the range of 12.0 to 22.0 Nm, the initial axial force $F_1$ may satisfy a relation $F_1<14.0$. Since, in this case, it is guaranteed that the upper limit value for the co-rotation torque will not be exceeded, accordingly it is possible to prevent the induction of loosening of the tube fitting, while still avoiding causing damage to the brake tube.

In the above aspect, a zinc based plated layer may be formed upon the surfaces of the threaded portion and the contact portion respectively, the resin coating layer may be provided over the zinc based plated layer, and the frictional coefficient of the resin coating layer may be smaller than the frictional coefficient of the surfaces formed by the zinc based plated layer. According to this aspect, the corrosion resistance of the tube fitting is enhanced. In particular, if a zinc-nickel alloy plated layer is provided as the zinc based plated layer, then the enhancement of the corrosion resistance is particularly prominent.

In the above aspect, the resin coating layer may be made by adhering coating material including the polyethylene based substance, the lubricant, and the solid particles to the coated region, and the viscosity of the coating material may be in a range of 4.24 to 5.27 mPa·s at a temperature of 25° C. measured using a rotational viscosimeter conforming to the ISO 2555:1990 standard and the rotational speed of whose spindle may be set to 60 rpm. According to this aspect, by selecting a coating material whose viscosity comes within this sort of range, it is possible to control the mass per unit area w in an appropriate manner.

A tube equipped with a tube fitting according to an aspect of the invention disclosed includes: a tube made from metal, the tube being provided with an annular portion upon an end portion thereof, the annular portion projecting in the radially outward direction from the tube, and provided with a bent portion at a position remote from the annular portion; and a tube fitting that is installed upon the external periphery of the tube so as to be prevented from coming off by the annular portion and the bent portion, and that can couple the tube to a mating member by being fastened to the mating member in the state of contacting the annular portion; wherein the tube fitting includes: a threaded portion upon which is formed an external thread that engages with an internal thread provided in the mating member; a contact portion that is provided at the end portion of the tube fitting in the direction of progression of the external thread when the tube fitting being fastened, and that, when the tube fitting is fastened to the mating member, contacts the annular portion and presses the annular portion against the mating member; and a resin coating layer provided over a coated region that includes the surfaces of the threaded portion and the contact portion; and wherein: a through hole extending in a direction parallel to the direction of progression is pierced through both the threaded portion and the contact portion, the external thread has an outer diameter of 9.53 to 14.0 mm, and the contact portion has an inner diameter of 4.98 to 8.44 mm; the resin coating layer is made by adhering a coating material including a polyethylene based substance, a lubricant, and solid particles to the coated region; and, when mass per unit area w g/m$^2$) is defined as being a value obtained by dividing the mass difference between a state with the resin coating layer and a state without the resin coating layer by the surface area of the coated region, the mass per unit area w satisfies the relation $0.79<w<10.07$.

According to the above aspect, the relation $0.79<w<10.07$ is satisfied with respect to the mass per unit area w, and accordingly, in a case that fastening and release are repeated, it is possible to obtain an initial axial force which keeps a co-rotation torque less than the upper limit value, and moreover it is possible to keep the axial force decrease ratio low.

In the above aspect, a relation $1.20<w<10.07$ may be satisfied with respect to the mass per unit area w. According to this aspect, in a case that fastening and release are repeated, it is possible to obtain an initial axial force which keeps a co-rotation torque less than the upper limit value, and moreover it is possible to keep the axial force decrease ratio low; and furthermore it is possible to ensure a corrosion resistance during re-use of the tube fitting that is equivalent to the corrosion resistance upon first use.

In the above aspect, the tube may be a brake tube that is employed as a brake conduit for an automobile, and, when a testing member corresponding to the mating member and a testing tube having the same outer diameter as the tube and having a testing annular portion corresponding to the annular portion may be prepared, and when a fastening test is repeated n times (where $1<n<6$), the fastening test including: fastening operation to fasten the tube fitting to the testing member with a tightening torque in the range of 12.0 to 22.0 Nm, in the state in which the contact portion is contacted against the testing annular portion; and release operation to release the coupling of the testing tube from the testing member by loosening its fastening state after the tightening operation: if the maximum axial force generated in the first performance of the fastening test is termed the initial axial force $F_1$ (kN) and the maximum axial force generated in the n-th performance of the fastening test is termed the n-th axial force $F_n$ (kN), and if a value obtained by $-(F_n-F_1)/(n-1)$ is defined as being the axial force decrease ratio $\alpha$ (kN/turn), then the initial axial force $F_1$ may satisfy a relation $F_1<14.0$ and the axial force decrease ratio $\alpha$ may satisfy a relation $0<\alpha<1.75$.

Since, according to this aspect, the relation $0<\alpha<1.75$ may be satisfied with respect to the axial force decrease ratio $\alpha$, accordingly it is possible to prevent decrease of the axial force during re-use, and it is possible to obtain the desired coupling force during re-use even when frightening is performed with the same tightening torque as that employed upon initial use. Moreover, since the relation $F_1<14.0$ is satisfied with respect to the initial axial force $F_1$, accordingly it is possible to guarantee that the upper limit value for the co-rotation torque is not exceeded, and it is possible to prevent induction of loosening of the tube fitting while still avoiding damage to the tube that is employed as a brake conduit.

In this aspect of the tube equipped with the tube fitting, a zinc based plated layer may be formed upon the surfaces of the threaded portion and the contact portion, the resin coating layer may be provided over the zinc based plated layer, a zinc-nickel alloy plated layer may be provided as the zinc based plated layer, and the frictional coefficient of the resin coating layer may be smaller than the frictional coefficient of the surfaces formed by the zinc based plated layer. Since, according to this aspect, a zinc-nickel alloy plated layer is provided as the zinc based layer, accordingly enhancement of the corrosion resistance is prominent.

A tube fitting according to an aspect of the invention disclosed is capable of coupling a tube made from metal and provided with an annular portion upon an end portion thereof, to a mating member by being installed upon the external periphery of the tube and by being fastened to the mating member in the state of contacting the annular portion, the annular portion projecting in the radially outward direction from the tube, the tube fitting comprising: a threaded portion upon which is formed an external thread that engages with an internal thread provided in the mating member; a contact portion that is provided at the end portion of the tube fitting in the direction of progression of the external thread when the tube fitting is being fastened, and that, when the tube fitting is fastened to the mating member, contacts the annular portion to press the annular portion against the mating member; and a resin coating layer provided over a coated region that includes the surfaces of the threaded portion and the contact portion; and wherein: the tube is a brake tube that is employed as a brake conduit for an automobile; a through hole extending in a direction parallel to the direction of progression is pierced through both the threaded portion and the contact portion, the external thread has an outer diameter of 9.53 to 14.0 mm, and the contact portion has an inner diameter of 4.98 to 8.44 mm; the resin coating layer includes a polyethylene based substance, a lubricant, and solid particles; and, when mass per unit area w (g/m$^2$) is defined as being a value obtained by dividing the mass difference between a state with the resin coating layer and a state without the resin coating layer by the surface area of the coated region, then, when a testing member corresponding to the mating member and a testing tube having the same outer diameter as the tube and having a testing annular portion corresponding to the annular portion are prepared, and a fastening test is repeated n times (where $1 \leq n \leq 6$), the fastening test including: fastening operation to fasten the tube fitting to the testing member with a tightening torque in the range of 12.0 to 22.0 Nm in the state in which the contact portion is contacted against the testing annular portion; and release operation to release the coupling of the testing tube from the testing member by loosening its fastening state after the fastening operation: if the maximum axial force generated in the first performance of the fastening test is termed the initial axial force $F_1$ (kN) and the maximum axial force generated in the n-th performance of the fastening test is termed the n-th axial force $F_n$ (kN), and if a value obtained by $-(F_n-F_1)/(n-1)$ is defined as being the axial force decrease ratio $\alpha$ (kN/turn), the range of the mass per unit area w is set so as to satisfy the relations $F_1<14.0$ and $0<\alpha<1.75$.

Since, according to the above aspect, the relation $0<\alpha<1.75$ is satisfied in relation to the axial force decrease ratio $\alpha$, accordingly it is possible to prevent decrease of the axial force during re-use, and it is possible to obtain the desired coupling force during re-use even when fastening is performed with the same tightening torque as that employed upon initial use. Moreover, since the relation $F_1<14.0$ is satisfied in relation to the initial axial force $F_1$, accordingly it is possible to guarantee that the upper limit value for the co-rotation torque is not exceeded, and it is possible to prevent induction of loosening of the tube fitting while still avoiding damage to the tube that is employed as a brake conduit.

In the above aspect, the range for the mass per unit area w may be $0.79<w<10.07$. According to this tube fitting, when fastening and release are repeated, it is possible to obtain the initial axial force while keeping the co-rotation torque less than the upper limit value, and moreover it is possible to keep the axial force decrease ratio low.

In the above aspect, a relation $1.20<w<10.07$ may be satisfied with respect to the mass per unit area w. According to this aspect, in a case that fastening and release are repeated, it is possible to obtain an initial axial force which keeps a co-rotation torque less than the upper limit value, and moreover it is possible to keep the axial force decrease ratio low; and furthermore it is possible to ensure a corrosion resistance during re-use of the tube fitting that is equivalent to the corrosion resistance upon first use.

In the above aspect, a relation $0.79<w<9.00$, a relation $0.79<w<7.50$, or a relation $0.79<w<6.00$ may be satisfied with respect to the mass per unit area w. When mass production of flare nuts is considered, it is beneficial in terms of production cost that the smaller the upper limit of the mass per unit area w is, the smaller the amount of coating material used becomes.

A method for manufacturing a tube fitting according to an aspect of the invention disclosed is a method for manufacturing a tube fitting that is capable of coupling a tube made from metal and provided with an annular portion upon an end portion thereof, to a mating member by being installed upon the external periphery of the tube and by being fastened to the mating member in the state of contacting the annular portion, the annular portion projecting in the radially outward direction from the tube, the method comprising: a preparation step of preparing the tube fitting; and a coating step of forming a resin coating layer upon a coated region provided upon the surface of the tube fitting; wherein: the coating step includes a dipping step of dipping the tube fitting into a coating material that includes as components a polyethylene based substance, a lubricant, and solid particles and having viscosity within a range of 4.24 to 5.27 mPa·s at 25° C. measured using a rotational viscosimeter conforming to the ISO 2555:1990 standard with the rotational speed of the spindle of the rotational viscosimeter set to 60 rpm, and adhering the coating material to the coated region, and a drying step of, after the dipping step, drying the coating material which is adhered to the coated region of the tube fitting; and in the dipping step, with mass per unit area w (g/m²) being defined as being a value obtained by dividing the mass difference between a state with the resin coating layer and a state without the resin coating layer, the mass per unit area w is controlled within the range $0.79<w<10.07$ by dipping the tube fitting while regulating the temperature of the coating material within a range of 30° C. to 40° C.

According to the above aspect, by selecting a coating material whose viscosity comes within the viscosity range described above, and by adjusting the temperature of this coating material to be within the temperature range described above, it is possible to control the mass per unit area w so that the relation $0.79<w<10.07$ is satisfied.

In the above aspect, in the drying step, the mass per unit area w may be controlled to be within the range $0.79<w<10.07$ by drying the coating material while rotating the tube fitting to which the coating material is adhered at a predetermined rotational speed. Since it is possible to dry the coating material while shaking off the excess coating material by centrifugal force, it is possible to control the mass per unit area w in an appropriate manner.

An axial force measurement device according to an aspect of the invention disclosed is an axial force measurement device which includes: a frame; a tightening actuation unit that performs tightening operation upon a screw type tube fitting installed upon a tube upon which is formed an annular portion projecting in the radially outward direction from the tube; and a mating member holding unit that holds a testing member into which the tube fitting is screwed and that is coupled to the tube, with the tightening actuation unit and the mating member holding unit being provided to the frame in line along the direction of a reference axis that extends in the direction of the center line of the tube fitting and the tube axis of the tube, wherein the testing member has: a first part through which is pierced a screw hole in which an internal thread that engages with the tube fitting is formed and a second part having a bottom portion against which the annular portion of the tube is pressed; and the mating member holding unit holds the first part and the second part in a state in which the screw hole of the first part and the bottom portion of the second part are concentrically abutted against one another, and wherein one of the first part and the second part is held by the mating member holding unit in a state in which it cannot shift along the direction of the reference axis, while movement of the other of the first part and the second part is restricted in the direction of the reference axis in a state in which a load cell that outputs a signal corresponding to the load in the reference axis direction is interposed.

Generally, the axial force of a screw type tube fitting is calculated by dividing the tightening torque by the torque coefficient and the nominal diameter of the screw. Since the torque coefficient is not constant and is set to an appropriate value by experience, the axial force that is calculated is only an approximate value. Due to this, in order to acquire the axial force of the tube fitting accurately, a device that can measure the axial force of the tube fitting directly is required. According to this axial force measurement device, when the tube fitting installed upon the tube is screwed into the member for testing, the tube fitting advances while engaging with the internal thread of the first part, and the annular portion presses against the second part. Due to this, a separating force acts upon the first part and the second part to pull them apart in the direction of the reference axis. One of the first part and the second part is held so that it cannot shift in the direction of the reference axis, while movement of the other one of the first part and the second part is restricted in the direction of the reference axis in a state that a load cell is interposed. Due to this, the load in the direction of the reference axis that acts upon that other one of the first part and the second part corresponds to the reaction force of the axial force of the tube fitting. Accordingly, it is possible directly to acquire the axial force of the tube fitting as a measurement value on the basis of the output signal of the load cell, irrespective of any calculation based upon the tightening torque.

In this aspect, the mating member holding unit may have a first jig that, along with holding either one of the first part and the second part, is fixed to the frame, and a second jig of which movement, along with holding the other one of the first part and the second part, is restrained in the direction of the reference axis with the load cell being imposed.

A measurement method of axial force according to an aspect of the invention disclosed is a measurement method of axial force of a tube fitting, where the axial force generated upon a screw type tube fitting is measured, the tube fitting being screwed into a testing member in a state that the tube fitting is installed upon a tube upon which is formed an annular portion projecting radially outward from the tube, the measurement method including: a first step of providing as the testing member, a first part through which is pierced a screw hole in which an internal thread that engages with the tube fitting is formed and a second part having a bottom portion against which the annular portion of the tube is pressed in line along a direction of a reference axis extending in a direction of a tube axis of the tube, so that the screw hole and the bottom portion are in a concentric state; a second step of holding one of the first and second parts provided in line along the direction of the reference axis in a state in which the one of the first and second parts cannot shift in the direction of the reference axis, and of screwing into the first part, the tube fitting installed upon the tube in a state that the other one of the first and second parts is restricted in the direction of the reference axis; and a third step of measuring as the axial force of the tube fitting, a load imposed upon the other one of the first and second parts in the direction of the reference axis.

The invention claimed is:

1. An axial force measurement device (100) including:
    a frame (101);
    a tightening actuation unit (102) that performs tightening operation upon a screw type tube fitting installed upon a tube upon which is formed an annular portion projecting in the radially outward direction from the tube;
    a testing member (TM); and
    a mating member holding unit (103) that holds the testing member (TM) into which the tube fitting is screwed and that is coupled to the tube, with the tightening actuation unit (102) and the mating member holding unit (103) being provided to the frame (101) in line along the direction of a reference axis that extends in the direction of the center line of the tube fitting and the tube axis of the tube,
    wherein the axial force measurement device (100) is characterized in that the testing member (TM) has:
    a first part (TMa) through which is pierced a screw hole in which an internal thread that engages with the tube fitting is formed; and
    a second part (TMb) having a bottom portion against which the annular portion of the tube is pressed; and the mating member holding unit (103) holds the first part (TMa) and the second part (TMb) in a state in which the screw hole of the first part (TMa) and the bottom portion of the second part (TMb) are concentrically abutted against one another, and
    wherein one of the first part (TMa) and the second part (TMb) is held by the mating member holding unit (103) in a state in which it cannot shift along the direction of the reference axis, while movement of the other of the first part (TMa) and the second part (TMb) is restricted in the direction of the reference axis in a state in which a load cell that outputs a signal corresponding to the load in the reference axis direction is interposed.

2. The axial force measurement device (100) according to claim 1, wherein the mating member holding unit (103) has a first jig (103a) that, along with holding either one of the first part (TMa) and the second part (TMb), is fixed to the frame (101), and a second jig (103b) of which movement, along with holding the other one of the first part (TMa) and the second part (TMb), is restrained in the direction of the reference axis with the load cell being imposed.

3. A measurement method of axial force of a tube fitting, where the axial force generated upon a screw type tube fitting is measured, the tube fitting being screwed into a testing member (TM) in a state that the tube fitting is installed upon a tube upon which is formed an annular portion projecting radially outward from the tube, the measurement method is characterized by including:
    a first step of providing as the testing member (TM), a first part (TMa) through which is pierced a screw hole in which an internal thread that engages with the tube fitting is formed and a second part (TMb) having a bottom portion against which the annular portion of the tube is pressed in line along a direction of a reference axis extending in a direction of a tube axis of the tube, so that the screw hole and the bottom portion are in a concentric state;
    a second step of holding one of the first and second parts (TMa, TMb) provided in line along the direction of the reference axis in a state in which the one of the first and second parts (TMa, TMb) cannot shift in the direction of the reference axis, and of screwing into the first part (TMa), the tube fitting installed upon the tube in a state that the other one of the first and second parts (TMa, TMb) is restricted in the direction of the reference axis; and a third step of measuring as the axial force of the tube fitting, a load imposed upon the other one of the first and second parts (TMa, TMb) in the direction of the reference axis.

* * * * *